United States Patent
Kitano et al.

(10) Patent No.: US 11,440,617 B2
(45) Date of Patent: Sep. 13, 2022

(54) HUMAN-POWERED VEHICLE CONTROL DEVICE AND HUMAN-POWERED VEHICLE TRANSMISSION SYSTEM

(71) Applicant: Shimano Inc., Osaka (JP)

(72) Inventors: Hiroyuki Kitano, Osaka (JP); Yuichi Ueyama, Osaka (JP); Yoshiyuki Kasai, Osaka (JP)

(73) Assignee: Shimano Inc., Osaka (JP)

( * ) Notice: Subject to any disclaimer, the term of this patent is extended or adjusted under 35 U.S.C. 154(b) by 338 days.

(21) Appl. No.: 16/901,529

(22) Filed: Jun. 15, 2020

(65) Prior Publication Data

US 2020/0407012 A1 Dec. 31, 2020

(30) Foreign Application Priority Data

Jun. 25, 2019 (JP) .............................. JP2019-117757

(51) Int. Cl.
| | | |
|---|---|---|
| *B62M 6/45* | (2010.01) | |
| *B62J 6/24* | (2020.01) | |
| *B62M 6/20* | (2010.01) | |
| *B62M 9/122* | (2010.01) | |
| *B62M 6/50* | (2010.01) | |

(52) U.S. Cl.
CPC ............... *B62M 6/45* (2013.01); *B62J 6/24* (2020.02); *B62M 6/50* (2013.01); *B62M 9/122* (2013.01)

(58) Field of Classification Search
CPC . B62M 6/24; B62M 6/45; B62M 6/50; B62M 9/122
See application file for complete search history.

(56) References Cited

U.S. PATENT DOCUMENTS

| | | | | |
|---|---|---|---|---|
| 8,930,054 B2* | 1/2015 | Garcia | .................. | B62H 5/001 |
| | | | | 701/22 |
| 10,407,125 B2* | 9/2019 | Ohashi | .................. | B62K 23/04 |
| 10,683,048 B2* | 6/2020 | Mai | ...................... | B62H 5/001 |
| 2016/0311499 A1* | 10/2016 | Kasai | ..................... | B62M 25/04 |

FOREIGN PATENT DOCUMENTS

JP 10-511621 A 11/1998

* cited by examiner

*Primary Examiner* — Tinh Dang
(74) *Attorney, Agent, or Firm* — Global IP Counselors, LLP

(57) ABSTRACT

A human-powered vehicle control device includes first and second rotary bodies, a transferring member that transfers drive force between the first and second rotary bodies, and a component. At least one of the first and second rotary bodies includes a plurality of rotary bodies. The component includes a transmission that performs a shifting action to move the transferring member between the plurality of rotary bodies. The control device includes an electronic controller controls the shifting action in accordance with a control condition set based on a travel state of the human-powered vehicle and/or a state of a rider. The electronic controller includes a first state that determines whether the control condition is satisfied and a second state that does not determine whether the control condition is satisfied. The electronic controller switches between the first and second states in accordance with a rotational state of the plurality of rotary bodies.

27 Claims, 9 Drawing Sheets

HUMAN-POWERED VEHICLE CONTROL DEVICE AND HUMAN-POWERED VEHICLE TRANSMISSION SYSTEM

CROSS-REFERENCE TO RELATED APPLICATIONS

This application claims priority to Japanese Patent Application No. 2019-117757, filed on Jun. 25, 2019. The entire disclosure of Japanese Patent Application No. 2019-117757 is hereby incorporated herein by reference.

BACKGROUND

Technical Field

The present invention generally relates to a human-powered vehicle control device and a human-powered vehicle transmission system.

Background Information

A human-powered vehicle control device is sometimes provided to control a human-powered vehicle component in accordance with a predetermined condition. For example, a human-powered vehicle transmission system is disclosed in Japanese National Phase Laid-Open Patent Publication No. 10-511621 in which a human-powered vehicle control device controls a transmission in accordance with a predetermined condition.

SUMMARY

One object of the present disclosure is to provide a human-powered vehicle control device and a human-powered vehicle transmission system that control a human-powered vehicle component in a preferred manner.

A control device in accordance with a first aspect of the present disclosure is a control device for a human-powered vehicle. The human-powered vehicle includes a first rotary body, a second rotary body, a transferring member configured to transfer a drive force between the first rotary body and the second rotary body, and a human-powered vehicle component. At least one of the first rotary body and the second rotary body includes a plurality of rotary bodies. The component includes a transmission configured to perform a shifting action to move the transferring member from one of the plurality of rotary bodies to another one of the plurality of rotary bodies. The control device comprises an electronic controller configured to control the shifting action of the transmission in accordance with a control condition set based on at least one of a travel state of the human-powered vehicle and a state of a rider of the human-powered vehicle. The electronic controller includes a first state in which the electronic controller determines whether or not the control condition is satisfied and a second state in which the electronic controller does not determine whether or not the control condition is satisfied. The electronic controller is configured to switch between the first state and the second state in accordance with a rotational state of the plurality of rotary bodies.

The control device according to the first aspect switches between the first state and the second state in accordance with the rotational state of the plurality of rotary bodies. This allows for a control preferable for the rotational state of the plurality of rotary bodies. Thus, the human-powered vehicle component is controlled in a preferred manner. In the second state, the electronic controller does not determine whether or not the control condition is satisfied. This reduces the calculation load on the electronic controller.

In accordance with a second aspect of the present disclosure, the control device according to the first aspect is configured so that the human-powered vehicle further includes a generator is configured to generate electric power as the human-powered vehicle travels. The electronic controller is configured to switch between the first state and the second state in accordance with an electric power generation state of the generator.

The control device according to the second aspect switches between the first state and the second state in accordance with the electric power generation state of the generator. This allows for a control preferable for the electric power generation state of the generator.

A control device in accordance with a third aspect of the present disclosure is a control device for a human-powered vehicle. The human-powered vehicle includes a generator is configured to generate electric power as the human-powered vehicle travels and a human-powered vehicle component. The component includes at least one of a drive unit and a notification unit. The control device comprises an electronic controller configured to control the component in accordance with a control condition set based on at least one of a travel state of the human-powered vehicle and a state of a rider of the human-powered vehicle. The electronic controller is configured to determine whether or not to control the component in accordance with an electric power generation state of the generator.

The control device according to the third aspect does not control the component in a case where the electric power generation state of the generator is not preferable for controlling the component. Thus, the human-powered vehicle component is controlled in a preferred manner.

In accordance with a fourth aspect of the present disclosure, the control device according to the third aspect is configured so that the electronic controller includes a first state in which the electronic controller determines whether or not the control condition is satisfied and a second state in which the electronic controller does not determine whether or not the control condition is satisfied. The electronic controller is configured to switch between the first state and the second state in accordance with the electric power generation state of the generator.

The control device according to the fourth aspect switches between the first state and the second state in accordance with the electric power generation state of the generator. This allows for a control preferable for the electric power generation state of the generator.

In accordance with a fifth aspect of the present disclosure, the control device according to the third or fourth aspect further comprises a detector configured to detect at least one of the travel state of the human-powered vehicle and the state of the rider of the human-powered vehicle. The electronic controller is configured to control the component in accordance with the control condition upon receiving a predetermined signal from the detector.

The control device according to the fifth aspect controls the component in a case where the predetermined signal is received from the detector.

In accordance with a sixth aspect of the present disclosure, the control device according to the third or fourth aspect is configured so that the human-powered vehicle further includes a first rotary body, a second rotary body, and a transferring member configured to transfer a drive force between the first rotary body and the second rotary body. At least one of the first rotary body and the second rotary body includes a plurality of rotary bodies. The generator is configured to generate electric power in accordance with rotation of the plurality of rotary bodies. The component includes a transmission that performs a shifting action to move the transferring member from one of the plurality of rotary bodies to another one of the plurality of rotary bodies. The electronic controller is configured to control the shifting action of the transmission in accordance with a control condition set based on at least one of the travel state of the human-powered vehicle and the state of the rider of the human-powered vehicle. The electronic controller is configured to determine whether or not to perform the shifting action of the transmission in accordance with the electric power generation state of the generator.

The control device according to the sixth aspect controls the transmission in accordance with the electric power generation state of the generator.

In accordance with a seventh aspect of the present disclosure, the control device according to any one of the first, second, and sixth aspects further comprises a detector configured to detect at least one of the travel state of the human-powered vehicle and the state of the rider of the human-powered vehicle. The electronic controller is configured to control the transmission in accordance with the control condition upon receiving a predetermined signal from the detector.

The control device according to the seventh aspect controls the transmission in a case where the predetermined signal is received from the detector.

In accordance with an eighth aspect of the present disclosure, the control device according to the seventh aspect is configured so that the detector is configured to detect a rotational speed of the plurality of rotary bodies.

The control device according to the eighth aspect controls the transmission in accordance with the output of the detector that detects the rotational speed of the plurality of rotary bodies.

In accordance with a ninth aspect of the present disclosure, the control device according to the second or sixth aspect is configured so that the electronic controller is configured to switch between a first electric power state and a second electric power state that consumes less electric power than the first electric power state. The electronic controller is configured to switch from the first electric power state to the second electric power state upon determining a state exists in which a rotational speed of the plurality of rotary bodies is less than or equal to a predetermined first speed continues over a predetermined first period or longer.

The control device according to the ninth aspect switches to the second electric power state in a case where a state in which the rotational speed of the plurality of rotary bodies is less than or equal to the predetermined first speed continues over the predetermined first period or longer in the first electric power state. This reduces the consumption of electric power.

In accordance with a tenth aspect of the present disclosure, the control device according to the ninth aspect is configured so that the electronic controller is configured to selectively switch between the first electric power state, the second electric power state, and a third electric power state that consumes less electric power than the second electric power state. The electronic controller is configured to switch from the second electric power state to the third electric power state upon determining a state exists in which the rotational speed of the plurality of rotary bodies is less than or equal to a predetermined second speed continues over a predetermined second period or longer.

The control device according to the tenth aspect switches to the third electric power state in a case where a state in which the rotational speed of the plurality of rotary bodies is less than or equal to the predetermined second speed continues over the predetermined second period or longer in the second electric power state. This reduces the consumption of electric power.

In accordance with an eleventh aspect of the present disclosure, the control device according to the tenth aspect is configured so that the electronic controller is configured to switch from the third electric power state to the first electric power state or the second electric power state upon determining at least one of the rotational speed of the plurality of rotary bodies becoming greater than or equal to a predetermined third speed and an electric power generation amount of the generator becoming greater than or equal to a predetermined electric power generation amount.

The control device according to the eleventh aspect switches to the first electric power state or the second electric power state in the third electric power state, in at least one of a case where the rotational speed of the plurality of rotary bodies becomes greater than or equal to the predetermined third speed and a case where the electric power generation amount of the generator becomes greater than or equal to the predetermined electric power generation amount. Thus, the electronic controller is operated in a preferred manner.

In accordance with a twelfth aspect of the present disclosure, the control device according to the tenth or eleventh aspect is configured so that the electronic controller is configured to control the transmission so as not to perform the shifting action until a predetermined wait period elapses after switching to the first electric power state upon determining a rotational angle of the plurality of rotary bodies is less than a predetermined angle during a period from a time at which the transmission starts the shifting action in the first electric power state to a time at which the electronic controller switches to the second electric power state or the third electric power state.

The control device according to the twelfth aspect restricts the shifting action until the predetermined wait period elapses after switching to the first electric power state in a case where the rotational angle of the plurality of rotary bodies is less than the predetermined angle during a period from a time at which the transmission starts the shifting action in the first electric power state to a time at which the electronic controller switches to the second electric power state or the third electric power state.

In accordance with a thirteenth aspect of the present disclosure, the control device according to the twelfth aspect is configured so that the predetermined wait period is a period from a time at which the transmission starts the shifting action to a time at which the rotational angle of the plurality of rotary bodies becomes greater than or equal to a predetermined angle.

The control device according to the thirteenth aspect restricts the shifting action until a period from a time at which the transmission starts the shifting action to a time at which the rotational angle of the plurality of rotary bodies becomes greater than or equal to the predetermined angle elapses.

In accordance with a fourteenth aspect of the present disclosure, the control device according to the twelfth or thirteenth aspect is configured so that the electronic controller is configured to control the shifting action of the transmission to be performed in a case where the rotational angle of the plurality of rotary bodies is less than a predetermined angle even if the predetermined wait period has not elapsed after switching to the first electric power state upon determining at least one of the human-powered vehicle traveling downhill and the plurality of rotary bodies rotating freely, during a period from a time at which the transmission starts the shifting action in the first electric power state to a time at which the electronic controller switches to the second electric power state or the third electric power state.

The control device according to the fourteenth aspect avoids a situation in which the shifting action of the transmission is not performed in at least one of a case where the human-powered vehicle is traveling downhill and a case where the plurality of rotary bodies are rotating freely.

In accordance with a fifteenth aspect of the present disclosure, the control device according to any one of the twelfth to fourteenth aspects is configured so that the predetermined angle differs in accordance with a shift stage of the transmission.

The control device according to the fifteenth aspect sets the predetermined angle preferable for each shift stage.

In accordance with a sixteenth aspect of the present disclosure, the control device according to any one of the tenth to fifteenth aspects further comprises storage. The electronic controller is configured to store information related to the shifting action of the transmission in the storage upon determining the electronic controller switches from the first electric power state to the second electric power state or the third electric power state.

The control device according to the sixteenth aspect holds the information related to the shifting action of the transmission also in the second electric power state or the third electric power state.

In accordance with a seventeenth aspect of the present disclosure, the control device according to any one of the first, second, and sixth to eleventh aspects is configured so that the electronic controller is configured to control the shifting action of the transmission to be performed for a number of times during a predetermined third period in at least one the human-powered vehicle traveling downhill and the plurality of rotary bodies rotating freely.

The control device according to the seventeenth aspect avoids a situation in which the shifting action of the transmission is not performed in at least one of a case where the human-powered vehicle is traveling downhill and a case where the plurality of rotary bodies are rotating freely.

In accordance with an eighteenth aspect of the present disclosure, the control device according to any one of the first, second, sixth to eleventh, and seventeenth aspects is configured so that the electronic controller is configured to control the shifting action of the transmission to be performed once during a predetermined fourth period in at least one of the human-powered vehicle not traveling downhill and the plurality of rotary bodies not rotating freely.

The control device according to the eighteenth aspect restricts the shifting action of the transmission from being performed a number of times of during the predetermined fourth period.

In accordance with a nineteenth aspect of the present disclosure, the control device according to any one of the first, second, and sixth to eighteenth aspects is configured so that the electronic controller is configured to control the shifting action of the transmission to be started in accordance with a phase of the plurality of rotary bodies.

The control device according to the nineteenth aspect starts the shifting action in a state in which the rotational phase of the plurality of rotary bodies is preferable for starting the shifting action of the transmission.

In accordance with a twentieth aspect of the present disclosure, the control device according to any one of the first, second, and sixth to nineteenth aspects is configured so that the electronic controller is configured to control the shifting action of the transmission so that a shift stage of the transmission is within a predetermined range in accordance with at least one of the travel state of the human-powered vehicle and the state of the rider of the human-powered vehicle. The predetermined range is configured to be changeable in accordance with an inclination of the human-powered vehicle.

The control device according to the twentieth aspect controls the transmission so that the range of the shift stage of the transmission is within the range preferable for the inclination of the human-powered vehicle.

In accordance with a twenty-first aspect of the present disclosure, the control device according to the twentieth aspect is configured so that the inclination of the human-powered vehicle includes a pitch angle of a vehicle body of the human-powered vehicle.

The control device according to the twenty-first aspect controls the transmission so that the range of the shift stage of the transmission is preferable for the pitch angle of the vehicle body of the human-powered vehicle.

In accordance with a twenty-second aspect of the present disclosure, the control device according to the twentieth or twenty-first aspect is configured so that the electronic controller is configured to control the shifting action of the transmission upon determining a parameter related to at least one of the travel state of the human-powered vehicle and the state of the rider of the human-powered vehicle exceeds a predetermined parameter range. The electronic controller is configured to change the predetermined parameter range upon determining the shift stage of the transmission is outside of the predetermined range.

The control device according to the twenty-second aspect controls the transmission so that the shift stage of the transmission is preferable by changing the predetermined parameter range in a case where the shift stage of the transmission is outside the predetermined parameter range.

In accordance with a twenty-third aspect of the present disclosure, the control device according to the twenty-second aspect is configured so that the predetermined parameter range is a range that is greater than or equal to a first threshold value and less than or equal to a second threshold value. The electronic controller is configured to decrease the second threshold value upon determining the shift stage of the transmission is smaller than the predetermined range, and increase the first threshold value upon determining the shift stage of the transmission is larger than the predetermined range.

The control device according to the twenty-third aspect decreases the second threshold value in a case where the shift stage of the transmission is smaller than the predetermined range and increases the first threshold value in a case where the shift stage is larger than the predetermined range.

In accordance with a twenty-fourth aspect of the present disclosure, the control device according to any one of the first, second, and sixth to twenty-third aspects is configured so that the transmission is a rear derailleur.

The control device according to the twenty-fourth aspect controls the rear derailleur in a preferred manner.

In accordance with a twenty-fifth aspect of the present disclosure, the control device according to any one of the first to twenty-fourth aspects is configured so that at least one of the travel state of the human-powered vehicle and the state of the rider of the human-powered vehicle includes an inclination of the human-powered vehicle, an acceleration of the human-powered vehicle, a rotational speed of a crank, a human driving force, a vehicle speed, a heartrate of the rider, and a travel load.

The control device according to the twenty-fifth aspect controls the transmission in a preferred manner in accordance with at least one of the inclination of the human-powered vehicle, the acceleration of the human-powered vehicle, the rotational speed of the crank, the human driving force, the vehicle speed, the heartrate of the rider, and the travel load.

A control device in accordance with a twenty-sixth aspect of the present disclosure is a control device for a human-powered vehicle. The human-powered vehicle includes a first rotary body, a second rotary body, a transferring member configured to transfer a drive force between the first rotary body and the second rotary body, and a human-powered vehicle component. At least one of the first rotary body and the second rotary body includes a plurality of rotary bodies. The component includes a transmission configured to perform a shifting action to move the transferring member from one of the plurality of rotary bodies to another one of the plurality of rotary bodies. The component includes a detector configured to detect a rotational speed of the plurality of rotary bodies with a detected portion provided on the plurality of rotary bodies. The detected portion is rotated integrally with the plurality of rotary bodies. The control device comprises an electronic controller configured to control the shifting action of the transmission in accordance with a control condition set based on at least one of a travel state of the human-powered vehicle and a state of a rider of the human-powered vehicle. The electronic controller is configured to determine whether or not to perform the shifting action in accordance with a rotational state of the plurality of rotary bodies.

The control device according to the twenty-sixth aspect determines whether or not to perform the shifting action of the transmission in accordance with the rotational state of the plurality of rotary bodies. Thus, the human-powered vehicle component is controlled in a preferred manner.

A transmission system in accordance with a twenty-seventh aspect of the present disclosure is a transmission system for a human-powered vehicle. The transmission system comprises the control device according to the second or sixth aspect, the transmission, and the generator. The transmission is configured to be capable of being actuated by electric power generated by the generator.

The transmission system according to the twenty-seventh aspect controls the human-powered vehicle component in a preferred manner in the human-powered vehicle that includes the transmission configured to be capable of being actuated by electric power generated by the generator.

The human-powered vehicle control device and the human-powered vehicle transmission system in accordance with the present disclosure allow for controlling the human-powered vehicle component in a preferred manner.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

Figure 1:
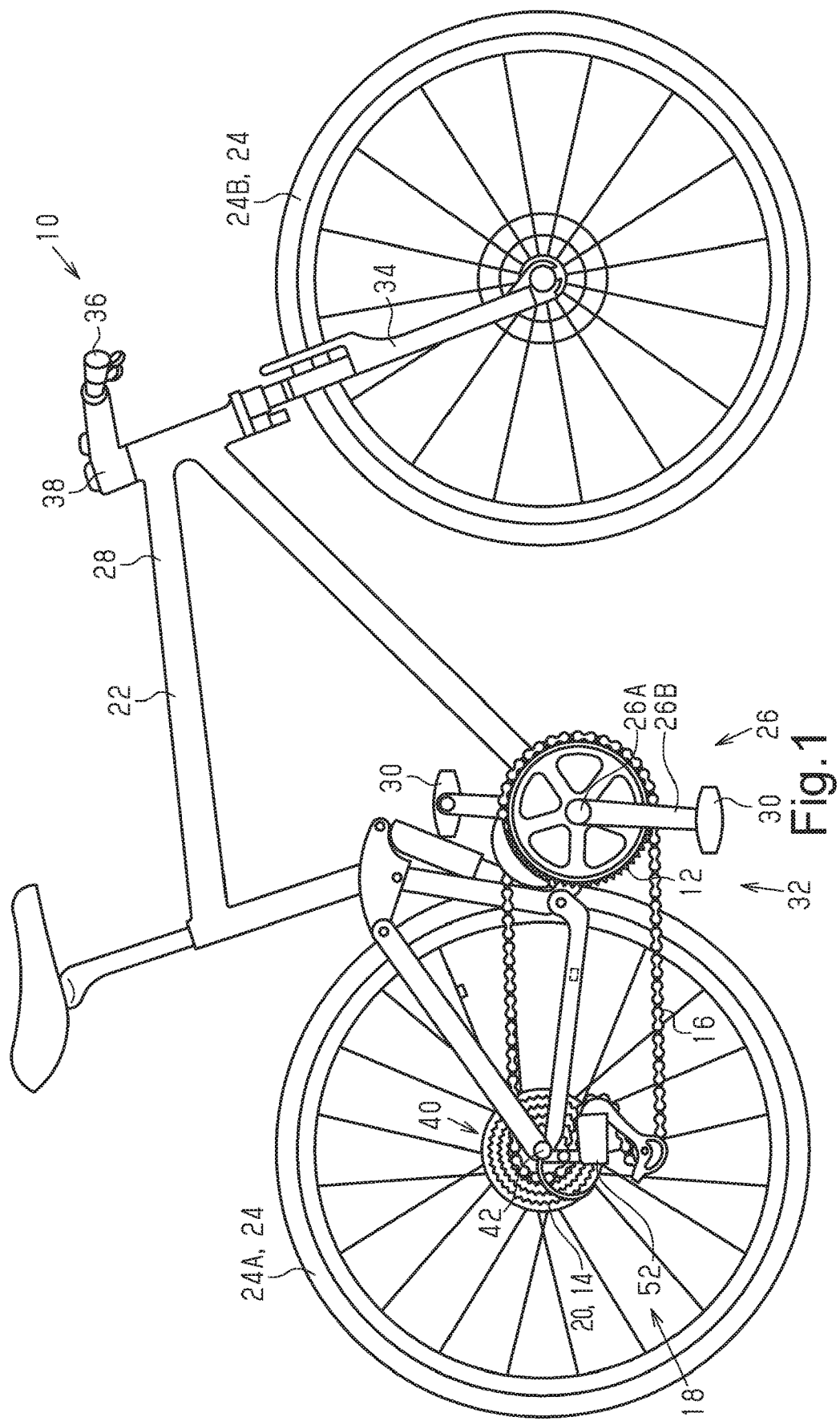
FIG. 1 is a side elevational view of a human-powered vehicle (e.g., a bicycle) including a human-powered vehicle control device in accordance with one embodiment.
Figure 2:
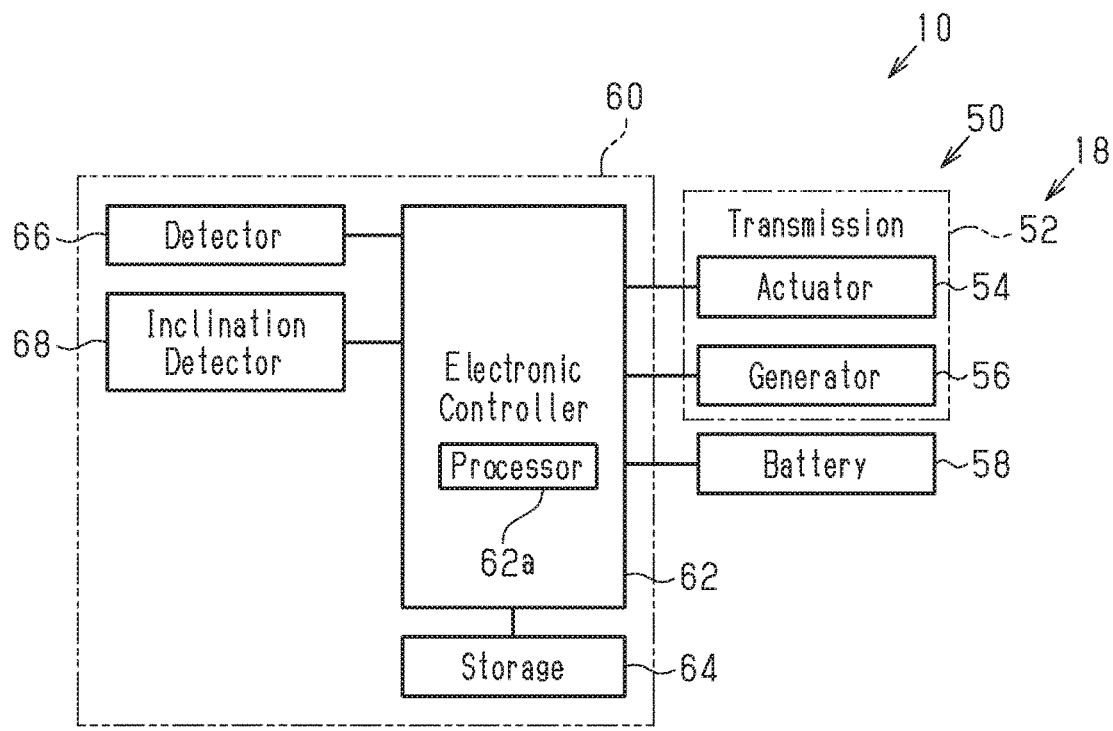
FIG. 2 is a block diagram showing the electric configuration of the human-powered vehicle control device in accordance with the embodiment.

Referring to FIGS. 1 and 2, a human-powered vehicle 10 (FIG. 1) is illustrated that is equipped with a human-powered vehicle transmission system 50 (FIG. 2) and a human-powered vehicle control device 60 (FIG. 2) in accordance with one embodiment. The human-powered vehicle 10 is a vehicle that can be driven by at least human driving force. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle, as well as an electric bicycle (E-bike). The electric bicycle includes an electric assist bicycle that assists in propulsion of the vehicle with an electric motor. In the embodiment described hereafter, the human-powered vehicle 10 will be referred to as a bicycle.

The human-powered vehicle 10 includes a first rotary body 12, a second rotary body 14, a transferring member 16, and a human-powered vehicle component 18. The transferring member 16 transmits drive force between the first rotary body 12 and the second rotary body 14. At least one of the first rotary body 12 and the second rotary body 14 includes a plurality of rotary bodies 20. The human-powered vehicle 10 further includes a vehicle body 22, wheels 24, and a crank 26. The wheels 24 include a rear wheel 24A and a front wheel 24B. The vehicle body 22 includes a frame 28. The crank 26 includes a crankshaft 26A and two crank arms 26B. The crankshaft 26A is rotatably supported by the frame 28. The two crank arms 26B are provided on two ends of the crankshaft 26A, respectively. Two pedals 30 are connected to the two crank arms 26B, respectively. The rear wheel 24A is driven by rotation of the crank 26. The rear wheel 24A is supported by the frame 28. The crank 26 is connected to the rear wheel 24A by a drive mechanism 32. The drive mechanism 32 includes the first rotary body 12, the second rotary body 14, and the transferring member 16. The crankshaft 26A can be connected to the first rotary body 12 by a first one-way clutch. The first one-way clutch is configured to rotate the first rotary body 12 forward in a case where the crank 26 is rotated forward and configured not to rotate the first rotary body 12 rearward in a case where the crank 26 is rotated rearward. The first rotary body 12 includes a sprocket, a pulley, or a bevel gear. The transferring member 16 transmits rotational force of the first rotary body 12 to the second rotary body 14. The transferring member 16 includes, for example, a chain, a belt, or a shaft.

The second rotary body 14 is connected to the rear wheel 24A. The second rotary body 14 includes a sprocket, a pulley, or a bevel gear. Preferably, a second one-way clutch is provided between the second rotary body 14 and the rear wheel 24A. The second one-way clutch is configured to rotate the rear wheel 24A forward in a case where the second rotary body 14 is rotated forward and configured not to rotate the rear wheel 24A rearward in a case where the second rotary body 14 is rotated rearward. The rear wheel 24A of the human-powered vehicle 10 includes a hub 40. The hub 40 of the rear wheel 24A includes a hub shaft 42, a hub rotary body, and a freewheel. The hub rotary body is rotated integrally with the rear wheel 24A relative to the hub shaft 42. The freewheel is rotated relative to the hub shaft 42 and supports the second rotary body 14. Preferably, a second one-way clutch is provided between the hub rotary body and the freewheel.

The front wheel 24B is attached to the frame 28 by a front fork 34. A handlebar 36 is connected to the front fork 34 by a stem 38. In the present embodiment, the rear wheel 24A is connected to the crank 26 by the drive mechanism 32. However, at least one of the rear wheel 24A and the front wheel 24B can be connected to the crank 26 by the drive mechanism 32.

The component 18 includes a transmission 52. The transmission 52 performs a shifting action to move the transferring member 16 from one rotary body 20 to another rotary body 20 of the rotary bodies 20. The transmission 52 includes an actuator 54. The actuator 54 includes, for example, an electric motor. In a case where the actuator 54 is driven, the transmission 52 performs a shifting action. Preferably, the transmission 52 includes a derailleur. Preferably, the transmission 52 is a rear derailleur. In a case where the transmission 52 is a rear derailleur, the second rotary body 14 corresponds to the rotary bodies 20. The transmission 52 performs a shifting action to change a transmission ratio R of a rotational speed of the rear wheel 24A to a rotational speed of the crank 26 in a stepped manner. A shift stage is indicated by a larger number if the shift stage corresponds to a larger transmission ratio R.

Preferably, the human-powered vehicle 10 further includes a generator 56 that generates electric power as the human-powered vehicle 10 travels. The generator 56 is, for example, provided on the hub 40 of the rear wheel 24A. The generator 56 includes, for example, a hub dynamo. The generator 56 generates electric power in a case where the rotation of the second rotary body 14 rotates the rear wheel 24A. Preferably, the electric power generated by the generator 56 is supplied to a battery 58. The generator 56 can include a capacitor that supplies the electric power to the component 18 and the control device 60.

Preferably, the human-powered vehicle 10 includes the battery 58. The battery 58 includes one or more battery cells. Each battery cell includes a rechargeable battery. The battery 58 supplies electric power to the component 18 and the control device 60. Preferably, the battery 58 is connected to an electronic controller 62 of the control device 60 through wired or wireless connection in a manner allowing for communication. The battery 58 is configured to communicate with the electronic controller 62 through, for example, power line communication (PLC).

The human-powered vehicle transmission system 50 includes the control device 60, the transmission 52, and the generator 56. The transmission 52 is configured to be capable of being actuated by the electric power generated by the generator 56. Preferably, the transmission system 50 further includes the battery 58.

The control device 60 includes the electronic controller 62. The term "electronic controller" as used herein refers to hardware that executes a software program, and does not include a human. The electronic controller 62 is, for example, a central processing unit (CPU) or a micro-processing unit (MPU) that includes at least one processor 62a that executes predetermined control programs. The processors can be located at separate positions. The electronic controller 62 can include one or more microcomputers. Preferably, the control device 60 further includes storage 64. The storage 64 stores information used for various types of information, control programs and control processes. The storage 64 includes any computer storage device or any non-transitory computer-readable medium with the sole exception of a transitory, propagating signal. For example, the storage 64 includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

The electronic controller 62 is configured to be capable of controlling the shifting action of the transmission 52 in accordance with a control condition set based on at least one of a travel state of the human-powered vehicle 10 and a state of a rider of the human-powered vehicle 10. Preferably, the electronic controller 62 is configured to control the shifting action of the transmission 52 in a case where a parameter P relates to at least one of the travel state of the human-powered vehicle 10 and the state of the rider of the human-powered vehicle 10 exceeds a predetermined parameter range WP. The control condition is satisfied, for example, in a case where the parameter P exceeds the predetermined parameter range WP. In a first state, in a case where the control condition is satisfied, the electronic controller 62 sets a shifting event and issues a shifting instruction to the transmission 52 in accordance with the shifting event. The actuator 54 of the transmission 52 is driven in response to the shifting instruction.

At least one of the travel state of the human-powered vehicle 10 and the state of the rider of the human-powered vehicle 10 includes an inclination of the human-powered vehicle 10, an acceleration of the human-powered vehicle, a rotational speed of the crank, a human driving force, a vehicle speed, a heartrate of the rider, and a travel load.

In one example, the travel state of the human-powered vehicle 10 and the state of the rider of the human-powered vehicle 10 are the rotational speed of the crank 26, and the parameter P is the rotational speed of the crank 26. For example, the electronic controller 62 increases the transmission ratio R in a case where the rotational speed of the crank 26 exceeds an upper limit value of the parameter range WP and decreases the transmission ratio R in a case where the rotational speed of the crank 26 becomes less than a lower limit value of the parameter range WP. In a case where the travel state of the human-powered vehicle 10 and the state of the rider of the human-powered vehicle 10 include the rotational speed of the crank 26, the parameter P includes the rotational speed of the crank 26, and it is preferred that the control device 60 includes a crank rotation sensor.

In another example, the travel state of the human-powered vehicle 10 and the state of the rider of the human-powered vehicle 10 are a pitch angle D, and the parameter P is the pitch angle D. For example, in a case where the pitch angle D becomes greater than or equal to a first angle D1 corresponding to an uphill, the electronic controller 62 performs a shifting action to set the shift stage so that the transmission ratio R becomes less than or equal to a predetermined transmission ratio RX. In a case where the travel state of the human-powered vehicle 10 and the state of the rider of the human-powered vehicle 10 include the pitch angle D, the parameter P includes the pitch angle D, and it is preferred that the control device 60 includes at least one of a tilt sensor and a global positioning system (GPS) receiver.

In addition to or instead of at least one of the rotational speed of the crank 26 and the pitch angle D, the travel state of the human-powered vehicle 10 and the state of the rider of the human-powered vehicle 10 can include at least one of the human driving force input to the human-powered vehicle 10, the travel load, and the heartrate of the rider. In a case where the travel state of the human-powered vehicle 10 and the state of the rider of the human-powered vehicle 10 include the human driving force, the parameter P includes torque or power based on the human driving force. Preferably, a detector 66 includes a torque sensor. The term "detector" as used herein refers to a hardware device or instrument designed to detect the presence of a particular object or substance and to emit a signal in response. The term "detector" as used herein do not include a human. In a case where the travel state of the human-powered vehicle 10 and the state of the rider of the human-powered vehicle 10 include travel resistance, the parameter P includes a parameter related to the travel resistance. Preferably, the detector 66 includes at least one of a torque sensor, a wind sensor, and a tilt sensor. In a case where the travel state of the human-powered vehicle 10 and the state of the rider of the human-powered vehicle 10 include the heartrate of the rider, the parameter P includes the heartrate of the rider. Preferably, the control device 60 includes a heartrate sensor.

Preferably, the control device 60 further includes the detector 66 that detects at least one of the travel state of the human-powered vehicle 10 and the state of the rider of the human-powered vehicle 10. Preferably, the detector 66 is configured to be capable of detecting a rotational speed V of the rotary bodies 20. Preferably, the detector 66 is configured to be capable of detecting the rotational speed V of the rotary bodies 20 with a detected portion provided on the rotary bodies 20. The detected portion is rotated integrally with the rotary bodies 20. The detected portion includes, for example, a magnet. Preferably, the detector 66 is configured to output a detection signal a predetermined number of times while the rotary bodies 20 rotates once. Preferably, the predetermined number of times is one. The detector 66 outputs a signal corresponding to the rotational speed V of the rotary bodies 20. Preferably, the detector 66 includes a magnetic reed forming a reed switch or a Hall element. The detector 66 is attached to the hub shaft 42 of the hub 40 of the rear wheel 24A of the human-powered vehicle 10 and detects a magnet attached to the freewheel that is rotated integrally with the rotary bodies 20. In the present embodiment, the detector 66 is configured so that a reed switch detects a magnet whenever the rotary bodies 20 rotates once. The rotational speed V of the rotary bodies 20 and the rotational speed of the crank 26 can be converted from each other using the transmission ratio R. Thus, the detector 66 can be a crank rotation sensor. In this case, the detector 66 can be configured to detect a magnet provided on the crank 26 instead of the magnet provided on the freewheel. The detector 66 can be configured to output a detection signal to the electronic controller 62 whenever the magnet is detected or output a detection signal, which includes a calculation result obtained by calculating the rotational speed V, to the electronic controller 62. The detector 66 can be configured to output a detection signal related to electric power generation of the generator 56. The detector 66 can be configured to output a detection signal related to the vehicle speed of the human-powered vehicle 10 as a detection signal related to the electric power generation of the generator 56. In this case, the detector 66 can be configured to detect a magnet provided on the wheel 24.

The electronic controller 62 includes the first state and a second state. In the first state, the electronic controller 62 determines whether or not the control condition is satisfied. In the second state, the electronic controller 62 does not determine whether or not the control condition is satisfied. The electronic controller 62 switches between the first state and the second state in accordance with a rotational state of the rotary bodies 20. In other words, the electronic controller 62 includes a first operating state in which the electronic controller 62 executes a determination process to determine whether or not the control condition is satisfied, and a second operating state in which the electronic controller 62 does not execute a determination process to determine whether or not the control condition is satisfied. The second operating state the electronic controller 62 includes a sleep mode, a shut down mode and a processing mode that does not include determining whether or not the control condition is satisfied.

Preferably, the electronic controller 62 is configured to be capable of controlling the component 18 in accordance with the control condition in a case where a predetermined signal is received from the detector 66. The predetermined signal includes, for example, a signal input to the electronic controller 62 from the detector 66 in a case where the rotational speed V of the rotary bodies 20 is greater than or equal to a speed VA. In a case where the detector 66 is configured to output a detection signal to the electronic controller 62 whenever a magnet is detected, the predetermined signal is in correspondence with intervals of detection signals corresponding to the rotational speed V of the rotary bodies 20 that is greater than or equal to the speed VA. In a case where the detector 66 is configured to output a detection signal including the calculation result, which is obtained by calculating the rotational speed V, to the electronic controller 62, the predetermined signal corresponds to a signal including the calculation result which corresponds to the rotational speed V of the rotary bodies 20 that is greater than or equal to the speed VA. The speed VA includes, for example, the rotational speed V corresponding to a state in which the generator 56 is capable of generating an amount of electric power that is greater than or equal to a predetermined electric power generation amount.

The electronic controller 62 is configured to be capable of controlling the shifting action of the transmission 52 to be performed a number of times during a predetermined third period T3 in at least one of a case where the human-powered vehicle 10 is traveling downhill and a case where the rotary bodies 20 are rotating freely. The predetermined third period T3 corresponds to a period from a time at which the transmission 52 starts a shifting action to a time which the shifting action is completed. The predetermined third period T3 can be defined by a rotational angle A of the rotary bodies 20 or by time. The predetermined third period T3 can be set for each shift stage of the transmission 52. The predetermined third period T3 can be set for each shift stage and shifting direction of the transmission 52. The electronic controller 62 determines that the rotary bodies 20 are rotating freely, for example, in a case where the rotational speed of the rear wheel 24A is greater than the rotational speed V of the rotary bodies 20 and if a difference of the rotational speed V of the rotary bodies 20 and the rotational speed of the rear wheel 24A is greater than or equal to a predetermined difference. In a case where the rotary bodies 20 are rotating freely, the rotational speed V of the rotary bodies 20 can be zero. The electronic controller 62 determines that the human-powered vehicle 10 is traveling downhill in accordance with, for example, output of an inclination detector 68 that detects the inclination of the human-powered vehicle 10.

The electronic controller 62 is configured to be capable of controlling the shifting action of the transmission 52 to be performed once during a predetermined fourth period T4 in at least one of a case where the human-powered vehicle 10 is not traveling downhill and a case where the rotary bodies 20 are not rotating freely. The predetermined fourth period T4 corresponds to a period from a time at which the transmission 52 starts a shifting action to a time which the shifting action is completed. The predetermined fourth period T4 can be defined by the rotational angle A of the rotary bodies 20 or by time. The predetermined fourth period T4 can be set for each shift stage of the transmission 52. Preferably, the predetermined third period T3 is equal to the predetermined fourth period T4. The predetermined third period T3 can differ from the predetermined fourth period T4. The predetermined fourth period T4 can be set for each shift stage and shifting direction of the transmission 52.

If a shifting action is performed a number of times during the predetermined fourth period T4 in a case where torque applied to the rotary bodies 20 is greater than or equal to a predetermined torque, the rider will feel much awkwardness. Even if a shifting action is performed a number of times during the predetermined third period T3 in a case where the torque applied to the rotary bodies 20 is less than the predetermined torque, the rider will feel little awkwardness. In a case where the human-powered vehicle 10 is traveling downhill and a case where the rotary bodies 20 are rotating freely, the torque applied to the rotary bodies 20 is less than the predetermined torque. Thus, priority can be given to the shifting action.

The electronic controller 62 is configured to be capable of controlling the shifting action of the transmission 52 to be started in accordance with a phase of the rotary bodies 20. The electronic controller 62 is configured to be capable of controlling the shifting action of the transmission 52 to be started in a case where the phase of the rotary bodies 20 is a predetermined phase. The predetermined phase includes the phase of the rotary bodies 20 that is preferable for a shifting action. The predetermined phase is set, for example, in accordance with a phase of a structure engaging the transferring member 16 provided on the rotary bodies 20.

Figure 3:
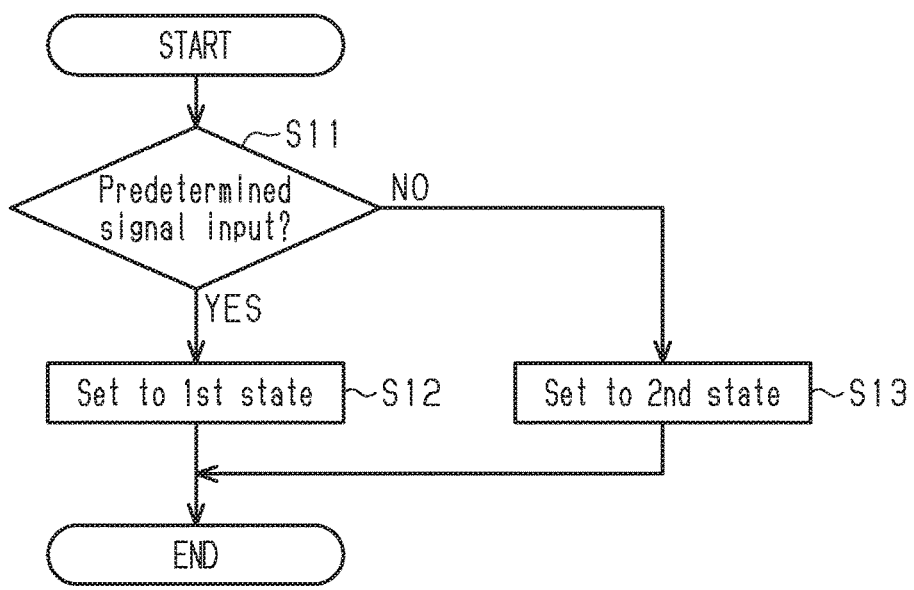
FIG. 3 is a flowchart illustrating a process executed by an electronic controller of the human-powered vehicle control device shown in FIG. 2 to switch between a first state and a second state.

A process for switching the first state and the second state will now be described with reference to FIG. 3. In a case where the electric power is supplied to the electronic controller 62, the electronic controller 62 starts the process and proceeds to step S11 of the flowchart shown in FIG. 3. In a case where the process of the flowchart in FIG. 3 ends, the electronic controller 62 repeats the process from step S11 in predetermined cycles until the supply of electric power stops.

In step S11, the electronic controller 62 determines whether the predetermined signal has been received. In a case where the predetermined signal has been received, the electronic controller 62 proceeds to step S12. In step S12, the electronic controller 62 sets the first state. In a case where the second state has been set, the electronic controller 62 switches to the first state. In a case where the first state has been set, the electronic controller 62 maintains the first state.

In step S11, in a case where the predetermined signal is not received, the electronic controller 62 proceeds to step S13. In step S13, the electronic controller 62 sets the second state. In a case where the first state has been set, the electronic controller 62 switches to the second state. In a case where the second state has been set, the electronic controller 62 maintains the second state.

Figure 4:
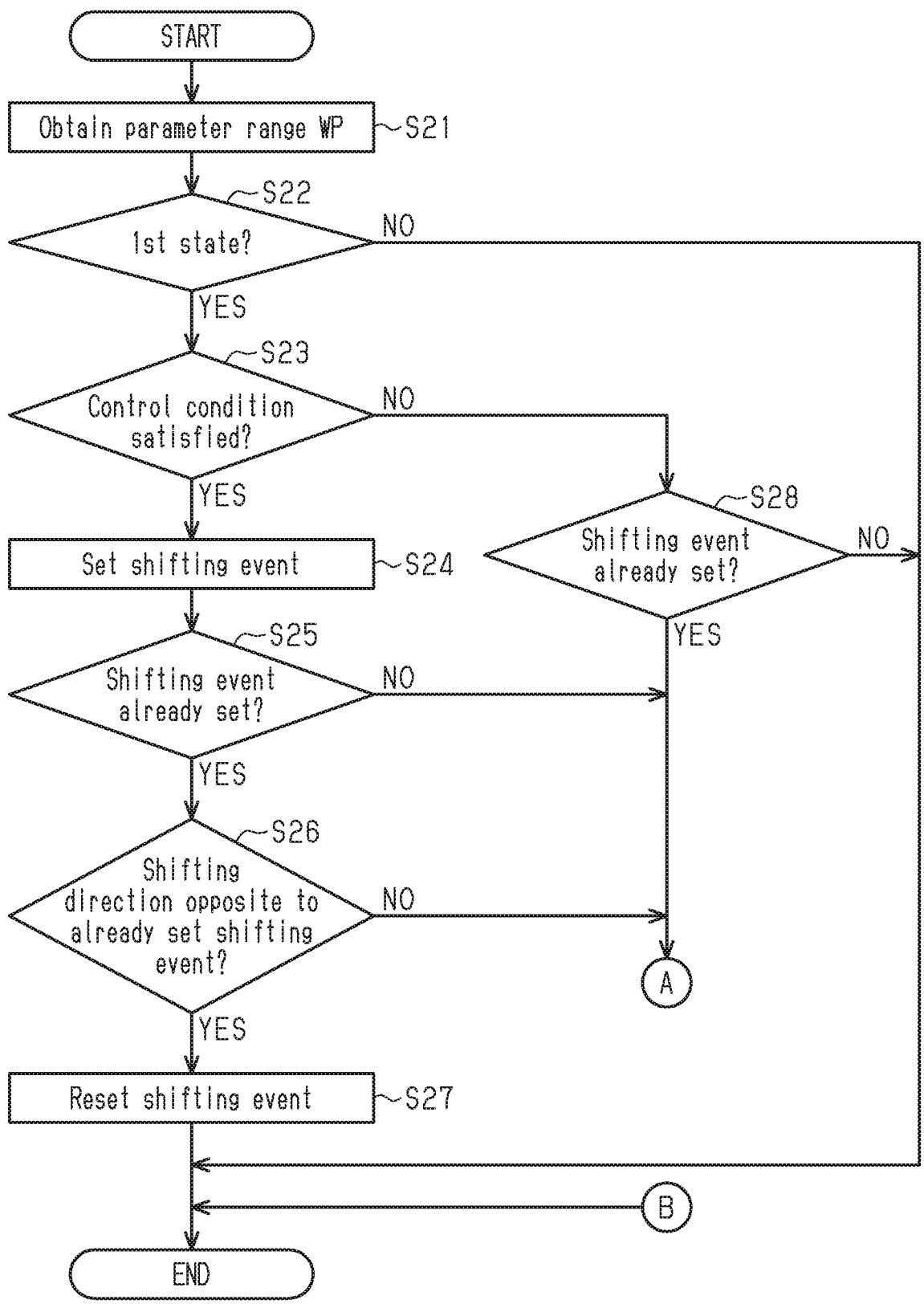
FIG. 4 is a flowchart illustrating a first part of a process executed by the electronic controller shown in FIG. 2 to control a shifting action of a transmission.

A process for controlling the shifting action of the transmission 52 will now be described with reference to FIGS. 4 and 5. In a case where the electric power is supplied to the electronic controller 62, the electronic controller 62 starts the process and proceeds to step S21 of the flowchart shown in FIG. 4. In a case where the process of the flowcharts in FIGS. 4 and 5 ends, the electronic controller 62 repeats the process from step S21 in predetermined cycles until the supply of electric power stops.

In step S21, the electronic controller 62 obtains the parameter range WP and proceeds to step S22. In step S22, the electronic controller 62 determines whether the state is the first state. In a case where the state is not the first state, the electronic controller 62 ends the process. In a case where the state is the first state, the electronic controller 62 proceeds to step S23. In step S23, the electronic controller 62 determines whether or not the control condition is satisfied. The electronic controller 62 determines that the control condition is satisfied, for example, in a case where the rotational speed of the crank 26 is outside the parameter range WP obtained in step S21. In a case where the control condition is satisfied, the electronic controller 62 proceeds to step S24.

In step S24, the electronic controller 62 sets the shifting event and proceeds to step S25. For example, in a case where a condition for changing the shift stage to increase the transmission ratio R has been satisfied, the electronic controller 62 sets a flag for increasing the transmission ratio R, and in a case where a condition for changing the shift stage to decrease the transmission ratio R has been satisfied, the electronic controller 62 sets a flag for decreasing the transmission ratio R.

In step S25, the electronic controller 62 determines whether the shifting event has already been set. For example, in a case where the shifting event has been set in accordance with another condition differing from the control condition and a case where the shifting event has been set in step S24 of the preceding control cycle, the electronic controller 62 proceeds to step S26. In step S26, the electronic controller 62 determines whether the shifting direction of the shifting event, which has already been set, is opposite to that of the shifting event set in step S24. The electronic controller 62 determines that the shifting direction of the shifting event, which has already been set, is opposite to that of the shifting event set in step S24, for example, in a case where the flag for increasing the transmission ratio R is set in the shifting event, which has already been set, and the flag for decreasing the transmission ratio R is set in the shifting event set in step S24. The electronic controller 62 determines that the shifting direction of the shifting event, which has already been set, is opposite to that of the shifting event set in step S24, for example, in a case where the flag for decreasing the transmission ratio R is set in the shifting event, which has already been set, and the flag for increasing the transmission ratio R is set in the shifting event set in step S24. In a case where it is determined that the shifting direction of the shifting event, which has already been set, is opposite to that of the shifting event set in step S24, the electronic controller 62 proceeds to step S27.

The electronic controller 62 resets the shifting event in step S27 and then ends the process. Preferably, the electronic controller 62 resets both of the shifting event, which has already been set, and the shifting event set in step S24. The electronic controller 62 can reset only one of the shifting event, which has already been set, and the shifting event set in step S24. Specifically, the electronic controller 62 can reset the shifting event, which has already been set, or the shifting event set in step S24.

In a case where the control condition is not satisfied in step S23, the electronic controller 62 proceeds to step S28. In step S28, the electronic controller 62 determines whether the shifting event has already been set. For example, in a case where the shifting event has been set in accordance with another condition differing from the control condition and a case where the shifting event has been set in step S24 of the preceding control cycle, the electronic controller 62 proceeds to step S29.

In a case where the shifting event has not already been set in step S25, the electronic controller 62 proceeds to step S29. In step S26, in a case where the shifting direction of the shifting event, which has already been set, is not opposite to that of the shifting event set in step S24, the electronic controller 62 proceeds to step S29.

In step S29, the electronic controller 62 determines whether or not the human-powered vehicle 10 is traveling downhill or whether or not the rotary bodies 20 are rotating freely. In a case where the human-powered vehicle 10 is not traveling downhill and the rotary bodies 20 are not rotating freely, the electronic controller 62 proceeds to step S30. In a case where the human-powered vehicle 10 is traveling downhill or the rotary bodies 20 are rotating freely, the electronic controller 62 proceeds to step S32.

In step S30, the electronic controller 62 determines whether the predetermined fourth period T4 has elapsed from the preceding shifting action. In a case where the predetermined fourth period T4 has not elapsed from the preceding shifting action, the electronic controller 62 ends the process. In a case where the predetermined fourth period T4 has elapsed from the preceding shifting action, the electronic controller 62 proceeds to step S31.

In step 31, the electronic controller 62 determines whether an elapsed time S from detection of the rotation of the rotary bodies 20 is within a predetermined time SX. The predetermined time SX is set to a time that allows for determination of whether rotation of the rotary bodies 20 has stopped. In a case where the elapsed time S is not within the predetermined time SX, the electronic controller 62 ends the process. In other words, the electronic controller 62 ends the process in a case where it is determined that the rotary bodies 20 are not rotating. In a case where the elapsed time S is within the predetermined time SX, the electronic controller 62 proceeds to step S32. In other words, the electronic controller 62 proceeds to step S32 in a case where it is determined that the rotary bodies 20 are rotating.

In step S32, the electronic controller 62 determines whether the phase of the rotary bodies 20 is the predetermined phase. The electronic controller 62 repeats step S32 until the phase of the rotary bodies 20 becomes the predetermined phase. In a case where the phase of the rotary bodies 20 is the predetermined phase, the electronic controller 62 proceeds to step S33. The electronic controller 62 issues the shifting instruction in step S33 and proceeds to step S34. In the shifting instruction, the electronic controller 62, for example, outputs a signal to drive the actuator 54 of the transmission 52. The electronic controller 62 resets the shifting event in step S34 and then ends the process.

Preferably, the electronic controller 62 is configured to be capable of controlling the shifting action of the transmission 52 in accordance with at least one of the travel state of the human-powered vehicle 10 and the state of the rider of the human-powered vehicle 10 so that the shift stage of the transmission 52 is within a predetermined range WR. The electronic controller 62 is configured to be capable of changing the predetermined range WR in accordance with the inclination of the human-powered vehicle 10. In one example, the inclination of the human-powered vehicle 10 includes the pitch angle D of the vehicle body 22 of the human-powered vehicle 10.

Preferably, the control device 60 includes the inclination detector 68 that detects the inclination of the human-powered vehicle 10. Preferably, the inclination detector 68 includes at least one of a tilt sensor and a GPS receiver. A tilt sensor includes, for example, at least one of a gyro sensor and an acceleration sensor. In a case where the inclination detector 68 includes a GPS receiver, the electronic controller 62 stores map information including information related to road gradient to the storage 64. The electronic controller 62 obtains the road gradient of the present location of the human-powered vehicle 10 as the pitch angle D.

Table 1 shows an example of the relationship of the pitch angle D, the road gradient corresponding to the pitch angle D, and a lowest stage number R1 and a highest stage number R2 of the predetermined range WR of the shift stage. The transmission 52 of Table 1 includes ten shift stages. In the case of Table 1, at pitch angles D that are smaller than or equal to a fifth angle range D5, the electronic controller 62 is configured to control the transmission 52 so that the lowest stage number R1 is the same and the highest stage number R2 is the same in predetermined ranges WR of the shift stage regardless of the pitch angle D. In the case of Table 1, at pitch angles D larger than or equal to a sixth angle range D6, the electronic controller 62 is configured to control the transmission 52 so that the lowest stage number R1 is smaller and the highest stage number R2 is smaller than in the predetermined range WR for a shift stage of pitch angle D that is smaller than or equal to the fifth angle range D5. In the case of Table 1, if the pitch angle D corresponds to an uphill, the electronic controller 62 is configured to control the transmission 52 so that the lowest stage number R1 and the highest stage number R2 of the predetermined range WR of the shift stage are smaller than a case where the pitch angle D corresponds to a downhill.

TABLE 1

| Pitch Angle D | Road Gradient | Predetermined Range WR | |
|---|---|---|---|
| | | Lowest Stage Number R1 | Highest Stage Number R2 |
| 1st Angle Range | less than −5% | 5 | 10 |
| 2nd Angle Range | −5% or greater, less than −3% | 5 | 10 |
| 3rd Angle Range | −3% or greater, less than −2% | 5 | 10 |
| 4th Angle Range | −2% or greater, less than 1% | 5 | 10 |
| 5th Angle Range | 1% or greater, less than 3% | 5 | 10 |
| 6th Angle Range | 3% or greater, less than 5% | 3 | 8 |
| 7th Angle Range | 5% or greater | 1 | 5 |

Preferably, the electronic controller 62 is configured to be capable of changing the predetermined parameter range WP in a case where the shift stage of the transmission 52 is outside the predetermined range WR. Preferably, the predetermined parameter range WP is a range that is greater than or equal to a first threshold value P1 and less than or equal to a second threshold value P2. The electronic controller 62 decreases the second threshold value P2 in a case where the shift stage of the transmission 52 is smaller than the predetermined range WR and increases the first threshold value P1 in a case where the shift stage of the transmission 52 is larger than the predetermined range WR. For example, the electronic controller 62 is configured to be capable of changing the predetermined parameter range WP in a case where a change in the inclination of the human-powered vehicle 10 results in the shift stage of the transmission 52 being outside the predetermined range WR. For example, in a case where the parameter P includes the rotational speed of the crank 26, the electronic controller 62 decreases the second threshold value P2 of the parameter range WP if the shift stage becomes a shift stage corresponding to the transmission ratio R that is smaller than the predetermined range WR. This allows the shift stage to easily change to a shift stage corresponding to a large transmission ratio R. Thus, the shift stage is easily returned to the predetermined range WR. For example, in a case where the parameter P includes the rotational speed of the crank 26, the electronic controller 62 increases the first threshold value P1 of the parameter range WP if the shift stage corresponds to the transmission ratio R that is larger than the predetermined range WR. In this case, the transmission ratio R is easily decreased, and the transmission ratio R is easily returned to the predetermined range WR.

Figure 6:
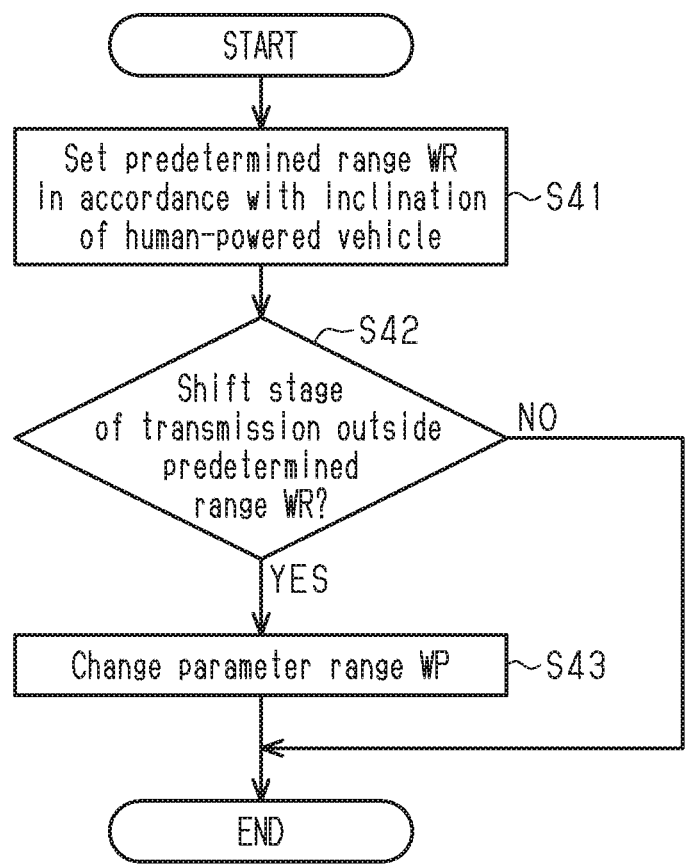
FIG. 6 is a flowchart illustrating a process executed by the electronic controller shown in FIG. 2 to change a parameter range.

A process for changing the parameter range WP will now be described with reference to FIG. 6. In a case where the electric power is supplied to the electronic controller 62, the electronic controller 62 starts the process and proceeds to step S41 of the flowchart shown in FIG. 6. In a case where the process of the flowchart in FIG. 6 ends, the electronic controller 62 repeats the process from step S41 in predetermined cycles until the supply of electric power stops.

The electronic controller 62 sets the predetermined range WR in accordance with the inclination of the human-powered vehicle 10 in step S41 and proceeds to step S42. The electronic controller 62 sets the lowest stage number R1 and the highest stage number R2 of the shift stage for the predetermined range WR, for example, in accordance with the pitch angle D according to Table 1.

In step S42, the electronic controller 62 determines whether the shift stage of the transmission 52 is outside the predetermined range WR. In a case where the shift stage of the transmission 52 is not outside the predetermined range WR, the electronic controller 62 ends the process. In a case where the shift stage of the transmission 52 is outside the predetermined range WR, the electronic controller 62 proceeds to step S43. The electronic controller 62 changes the parameter range WP in step S43 and then ends the process. Preferably, the electronic controller 62 stores the changed parameter range WP in the storage 64. In step S21 of the flowchart in FIGS. 4 and 5, the electronic controller 62 obtains the changed parameter range WP stored in the storage 64.

Preferably, the electronic controller 62 is configured to be capable of switching between a first electric power state and a second electric power state that consumes less electric power than the first electric power state. Preferably, in the first electric power state, in a case where a state in which the rotational speed V of the rotary bodies 20 is less than or equal to a predetermined first speed V1 continues over a predetermined first period T1 or longer, the electronic controller 62 is configured to be capable of switching to the second electric power state.

Preferably, the electronic controller 62 is configured to be capable of switching between the first electric power state, the second electric power state, and a third electric power state that consumes less electric power than the second electric power state. Preferably, in the second electric power state, in a case where a state in which the rotational speed V of the rotary bodies 20 is less than or equal to a predetermined second speed V2 continues over a predetermined second period T2 or longer, the electronic controller 62 is configured to be capable of switching to the third electric power state.

Preferably, in the third electric power state, in at least one of a case where the rotational speed V of the rotary bodies 20 becomes greater than or equal to a predetermined third speed V3 and a case where an electric power generation amount of the generator 56 becomes greater than or equal to a predetermined electric power generation amount, the electronic controller 62 is configured to be capable of switching to the first electric power state or the second electric power state. Preferably, in the third electric power state, in at least one of a case where the rotational speed V of the rotary bodies 20 becomes greater than or equal to the predetermined third speed V3 and a case where an electric power generation amount of the generator 56 becomes greater than or equal to the predetermined electric power generation amount, the electronic controller 62 is configured to be capable of switching to the first electric power state. The predetermined third speed V3 corresponds to the speed VA at which the generator 56 generates an amount of the electric power that allows the shifting action of the transmission 52 to be performed. The electronic controller 62 allows for switching from the third electric power state to the first electric power state or the second electric power state. Thus, an operation unit for activating the power supply can be omitted.

In the first electric power state, the second electric power state, and the third electric power state, the electronic controller 62 can change the electric power consumption, for example, by varying the frequency at which the detector 66 detects the rotational speed V of the rotary bodies 20.

Preferably, in the second electric power state, in a case where the rotational speed V of the rotary bodies 20 becomes greater than or equal to a predetermined fourth speed V4, the electronic controller 62 is configured to be capable of switching to the first electric power state. The predetermined fourth speed V4 corresponds to the speed VA at which the generator 56 generates an amount of the electric power that allows the shifting action of the transmission 52 to be performed. The predetermined fourth speed V4 can be the same as the predetermined third speed V3 or be different from the predetermined third speed V3.

Figure 7:
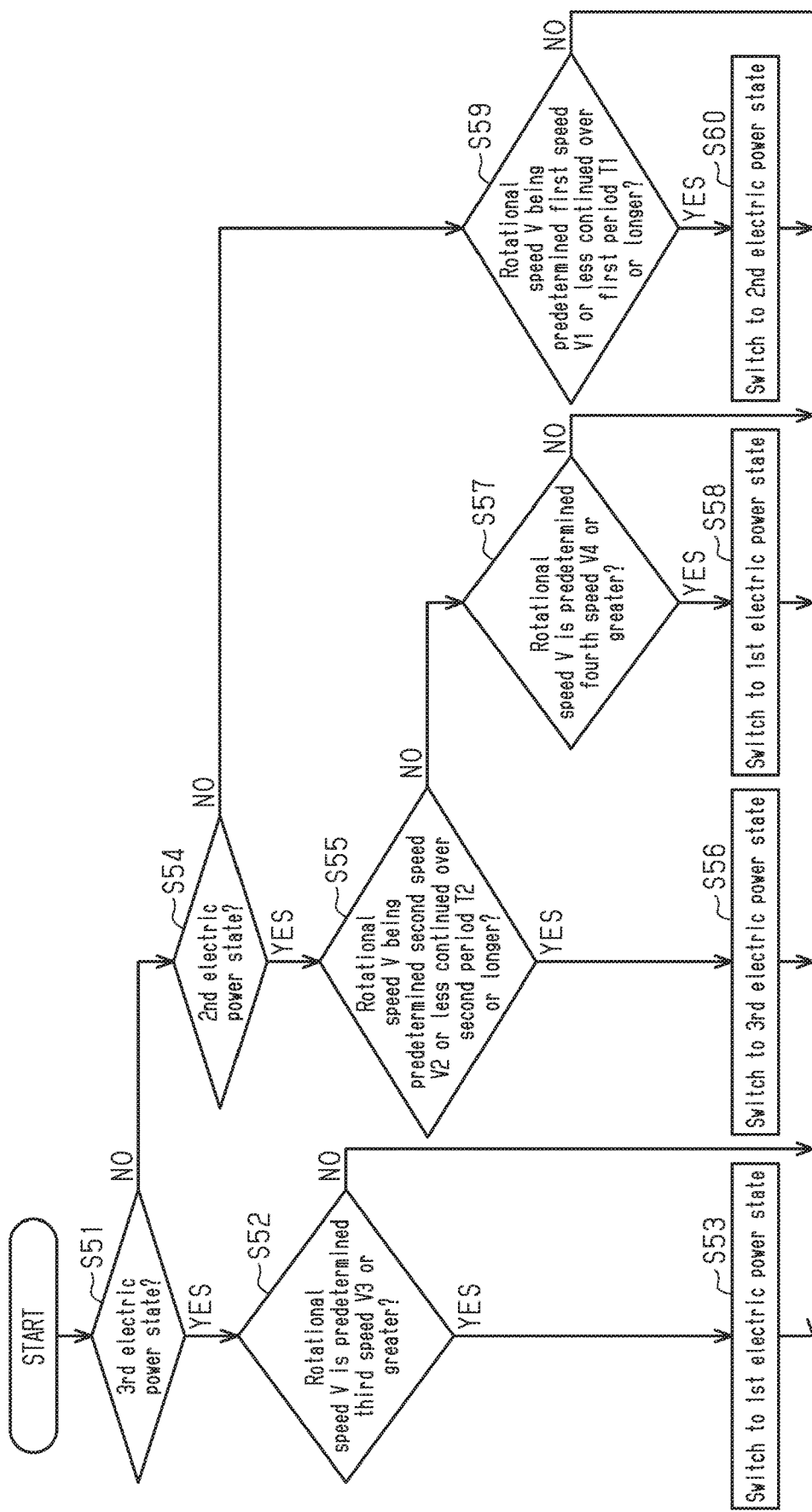
FIG. 7 is a flowchart illustrating a process executed by the electronic controller shown in FIG. 2 to switch an electric power state.

A process for changing the electric power state will now be described with reference to FIG. 7. In a case where the electric power is supplied to the electronic controller 62, the electronic controller 62 starts the process and proceeds to step S51 of the flowchart shown in FIG. 7. In a case where the process of the flowchart in FIG. 7 is ends, the electronic controller 62 repeats the process from step S51 in predetermined cycles until the supply of electric power stops.

In step S51, the electronic controller 62 determines whether the electronic controller 62 is in the third electric power state. In a case where the electronic controller 62 is in the third electric power state, the electronic controller 62 proceeds to step S52. In step S52, the electronic controller 62 determines whether the rotational speed V of the rotary bodies 20 is greater than or equal to the predetermined third speed V3. In a case where the rotational speed V of the rotary bodies 20 is not greater than or equal to the predetermined third speed V3, the electronic controller 62 ends the process. In a case where the rotational speed V of the rotary bodies 20 is greater than or equal to the predetermined third speed V3, the electronic controller 62 proceeds to step S53. The electronic controller 62 switches to the first electric power state in step S53 and then ends the process.

In a case where the electronic controller 62 is not in the third electric power state in step S51, the electronic controller 62 proceeds to step S54. In step S54, the electronic controller 62 determines whether the electronic controller 62 is in the second electric power state. In a case where the electronic controller 62 is the second electric power state, the electronic controller 62 proceeds to step S55. In step S55, the electronic controller 62 determines whether a state in which the rotational speed V of the rotary bodies 20 is less than or equal to the predetermined second speed V2 has continued over the second period T2 or longer. In a case where a state in which the rotational speed V of the rotary bodies 20 is less than or equal to the predetermined second speed V2 has not continued over the second period T2 or longer, the electronic controller 62 proceeds to step S57. In a case where a state in which the rotational speed V of the rotary bodies 20 is less than or equal to the predetermined second speed V2 has continued over the second period T2 or longer, the electronic controller 62 proceeds to step S56. The electronic controller 62 switches to the third electric power state in step S56 and then ends the process.

In step S57, the electronic controller 62 determines whether the rotational speed V of the rotary bodies 20 is greater than or equal to the predetermined fourth speed V4. In a case where the rotational speed V of the rotary bodies 20 is greater than or equal to the predetermined fourth speed V4, the electronic controller 62 proceeds to step S58. The electronic controller 62 switches to the first electric power state in step S58 and then ends the process.

In a case where the electronic controller 62 is not in the second electric power state in step S54, the electronic controller 62 proceeds to step S59. In step S59, the electronic controller 62 determines whether a state in which the rotational speed V of the rotary bodies 20 is less than or equal to the first predetermined speed V1 has continued over the first period T1 or longer. In a case where a state in which the rotational speed V of the rotary bodies 20 is less than or equal to the first predetermined speed V1 has not continued over the first period T1 or longer, the electronic controller 62 ends the process. In a case where a state in which the rotational speed V of the rotary bodies 20 is less than or equal to the predetermined first speed V1 has continued over the first period T1 or longer, the electronic controller 62 proceeds to step S60. The electronic controller 62 switches to the second electric power state in step S60 and then ends the process.

In a case where the rotational angle A of the rotary bodies 20 is less than a predetermined angle AX during a period from a time at which the transmission 52 starts a shifting action in the first electric power state to a time at which the electronic controller 62 switches to the second electric power state or the third electric power state, the electronic controller 62 is configured to be capable of controlling the transmission 52 so as not to perform a shifting action until a predetermined wait period TA elapses after switching to the first electric power state. Preferably, the predetermined wait period TA is a period from a time at which the transmission 52 starts a shifting action to a time at which the rotational angle A of the rotary bodies 20 becomes greater than or equal to the predetermined angle AX. Preferably, the predetermined angle AX varies in accordance with the shift stage of the transmission 52. The predetermined angle AX is set in accordance with a phase of a structure engaging the transferring member 16 provided on the rotary bodies 20. Preferably, a case where the transmission 52 starts a shifting action includes a case where the electronic controller 62 issues a shifting instruction in step S33.

The electronic controller 62 is configured to store information related to the shifting action of the transmission 52 in the storage 64 in a case where the electronic controller 62 switches from the first electric power state to the second electric power state or the third electric power state. The electronic controller 62 can store the information related to the shifting action of the transmission 52 in the storage 64 only in a case where the electronic controller 62 switches from the first electric power state to the second electric power state or the third electric power state. Alternatively, the electronic controller 62 can store the information related to the shifting action of the transmission 52 in the storage 64 in a predetermined control cycle in a case where the transmission 52 starts the shifting action. The information related to the shifting action of the transmission 52 includes, for example, the rotational angle A of the rotary bodies 20 from a time at which the shifting action is started.

A process for storing the information related to the shifting action of the transmission 52 in the storage 64 will now be described with reference to FIG. 8. In a case where electric power is supplied to the electronic controller 62, the electronic controller 62 starts the process and proceeds to step S61 of the flowchart shown in FIG. 8. In a case where the process of the flowchart in FIG. 8 ends, the electronic controller 62 repeats the process from step S61 in predetermined cycles until the supply of electric power stops.

In step S61, the electronic controller 62 determines whether or not to switch from the first electric power state to the second electric power state or the third electric power state. In a case where the electronic controller 62 does not switch from the first electric power state to the second electric power state or the third electric power state, the electronic controller 62 ends the process. In a case where the electronic controller 62 switches from the first electric power state to the second electric power state or the third electric power state, the electronic controller 62 proceeds to step S62.

The electronic controller 62 stores the information related to the shifting action in the storage 64 in step S62 and then ends the process.

A process related to the shifting action in a case where the electronic controller 62 switches to the first electric power state will now be described with reference to FIG. 9. In a case where the electric power is supplied to the electronic controller 62, the electronic controller 62 starts the process and proceeds to step S63 of the flowchart shown in FIG. 9. In a case where the process of the flowchart in FIG. 9 ends, the electronic controller 62 repeats the process from step S63 in predetermined cycles until the supply of electric power stops.

In step S63, the electronic controller 62 determines whether or not to switch from the second electric power state or the third electric power state to the first electric power state. In a case where the electronic controller 62 does not switch from the second electric power state or the third electric power state to the first electric power state, the electronic controller 62 ends the process. In a case where the electronic controller 62 switches from the second electric power state or the third electric power state to the first electric power state, the electronic controller 62 proceeds to step S64.

In step S64, the electronic controller 62 determines whether the shifting action has been completed. The electronic controller 62 determines that the shifting action has been completed, for example, by obtaining the information related to the shifting action stored in the storage 64 in step S62 of FIG. 8 and in a case where the rotational angle A of the rotary bodies 20 from a time at which the shifting action is started is greater than or equal to the predetermined angle AX. In a case where the shifting action has been completed in step S64, the electronic controller 62 proceeds to step S65. The electronic controller 62 cancels a prohibition flag of the shifting instruction in step S65 and then ends the process.

In a case where the shifting action has not been completed in, step S64, the electronic controller 62 proceeds to step S66. The electronic controller 62 sets the prohibition flag of the shifting instruction in step S66 and returns to step S64. In step S64, if a cumulative angle of the rotational angle A of the rotary bodies 20, which is stored in the storage 64 in a case where the electronic controller 62 switches from the first electric power state to the second electric power state or the third electric power state, and the rotational angle A from a time at which the electronic controller 62 switched to the first electric power state becomes greater than or equal to the predetermined angle AX, the electronic controller 62 proceeds to step S65. In this case, the predetermined wait period TA is a period from the predetermined angle AX until a time at which the rotational angle A of the rotary bodies 20 becomes greater than or equal to the rotational angle A, which is obtained by subtracting the rotational angle A of the rotary bodies 20 stored in the storage 64 in a case where the electronic controller 62 switches from the first electric power state to the second electric power state or the third electric power state. The electronic controller 62 does not issue the shifting instruction to the transmission 52 in a period during which the prohibition flag of the shifting instruction is set even if the control condition is satisfied.

Modifications

The description related with the above embodiment exemplifies, without any intention to limit, an applicable form of a human-powered vehicle control device and a human-powered vehicle transmission system according to the present disclosure. In addition to the embodiment described above, the human-powered vehicle control device and the human-powered vehicle transmission system according to the present disclosure are applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

In at least one of a case where the human-powered vehicle 10 is traveling downhill or a case where the rotary bodies 20 are rotating freely, during a period TX from a time at which the transmission 52 starts a shifting action in the first electric power state to a time at which the electronic controller 62 switches to the second electric power state or the third electric power state, the electronic controller 62 can be configured to be capable of controlling the shifting action of the transmission 52 to be performed in a case where the rotational angle A of the rotary bodies 20 is less than the predetermined angle AX even if the predetermined wait period TA has not elapsed after switching to the first electric power state. For example, the flowchart in FIG. 9 is changed to that in FIG. 10. In the flowchart of FIG. 10, in a case where step S64 is NO, the electronic controller 62 proceeds to step S71. In step S71, the electronic controller 62 determines whether or not the human-powered vehicle 10 is traveling downhill or whether or not the rotary bodies 20 are rotating freely. In a case where the human-powered vehicle 10 is traveling downhill or the rotary bodies 20 are rotating freely, the electronic controller 62 proceeds to step S65. In a case where the human-powered vehicle 10 is not traveling downhill and the rotary bodies 20 are not rotating freely, the electronic controller 62 proceeds to step S66.

The predetermined signal can include all detection signals received from the detector 66. In this case, the electronic controller 62 is configured to be capable of controlling the component 18 in accordance with the control condition whenever the detection signal is received from the detector 66. In a case where an output cycle of the detection signal from the detector 66 is short, the electronic controller 62 determines whether the control condition is satisfied less frequently. This reduces the calculation load on the electronic controller 62.

The predetermined signal can be output in a case where at least one of the travel state of the human-powered vehicle 10 and the state of the rider of the human-powered vehicle 10 is changed. At least one of the travel state of the human-powered vehicle 10 and the state of the rider of the human-powered vehicle 10 includes the inclination of the human-powered vehicle 10, the acceleration of the human-powered vehicle 10, the rotational speed of the crank 26, the human driving force, the vehicle speed, the heartbeat of the rider, and the travel load. In this case, the electronic controller 62 is configured to be capable of controlling the component 18 in accordance with the control condition only in a case where at least one of the travel state of the human-powered vehicle 10 and the state of the rider of the human-powered vehicle 10 is changed. This lowers the frequency at which the electronic controller 62 determines whether or not the control condition is satisfied and reduces the calculation load on the electronic controller 62. In this modification, the electronic controller 62 can be configured to determine that the predetermined signal is received in a case where a detection value related to at least one of the inclination of the human-powered vehicle 10, the acceleration of the human-powered vehicle, the rotational speed of the crank 26, the human driving force, the vehicle speed, the heartrate of the rider, and travel load included in the output of the detector 66 becomes a predetermined value. The electronic controller 62 can be configured to determine that the predetermined signal is received in a case where an amount of change per unit time of the detection value, which is included in the output of the detector 66 and related to at least one of the inclination of the human-powered vehicle 10, the acceleration of the human-powered vehicle 10, the rotational speed of the crank 26, the human driving force, the vehicle speed, the heartrate of the rider, and travel load, becomes greater than or equal to a predetermined amount of change. The detector 66 can be configured to output the predetermined signal to the electronic controller 62 in a case where the detection value related to at least one of the inclination of the human-powered vehicle 10, the acceleration of the human-powered vehicle, the rotational speed of the crank 26, the human driving force, the vehicle speed, the heartrate of the rider, and the travel load exceeds a predetermined value.

Figure 5:
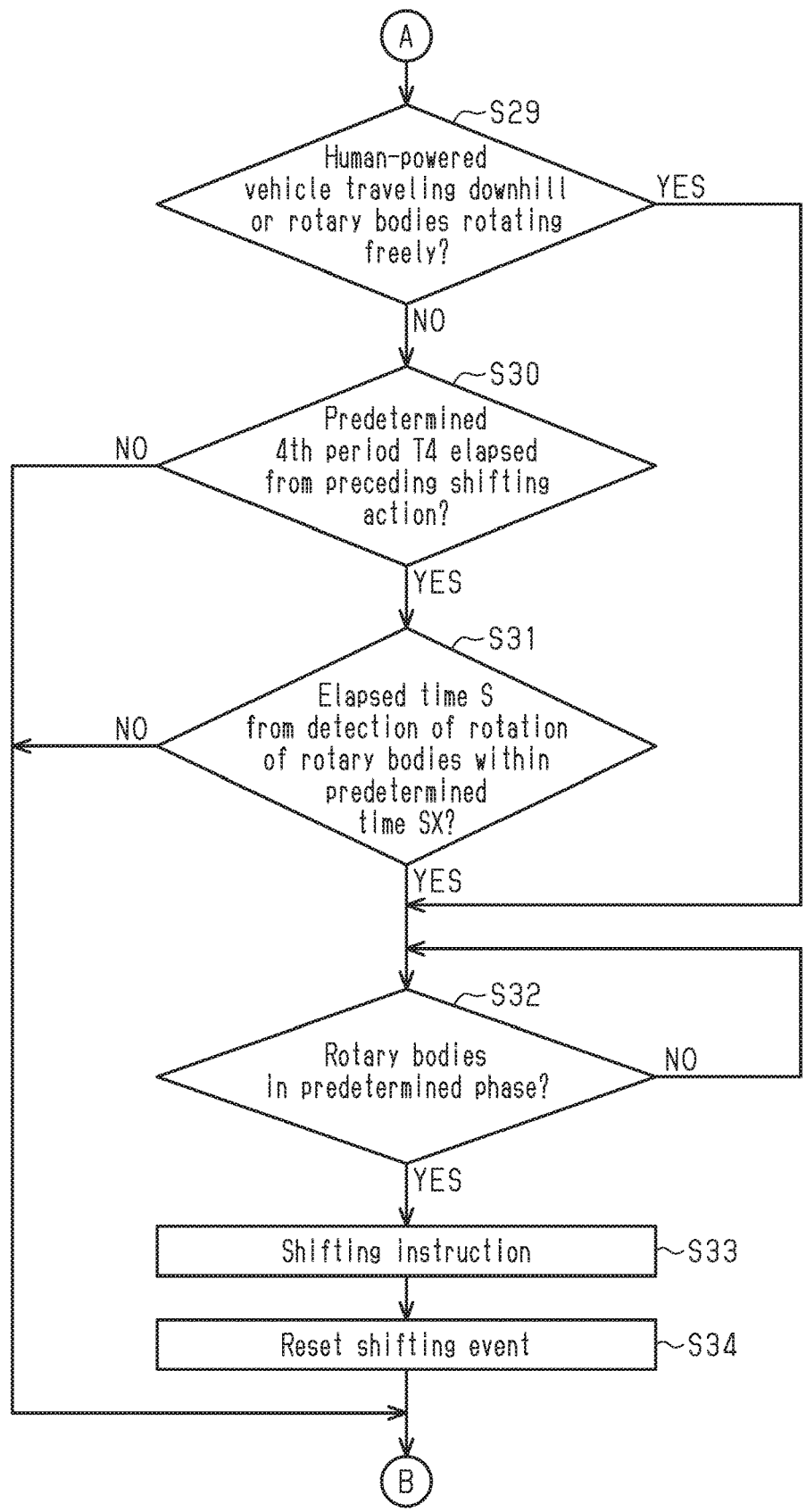
FIG. 5 is a flowchart illustrating a second part of the process executed by the electronic controller shown in FIG. 2 to control the shifting action of the transmission.
Figure 9:
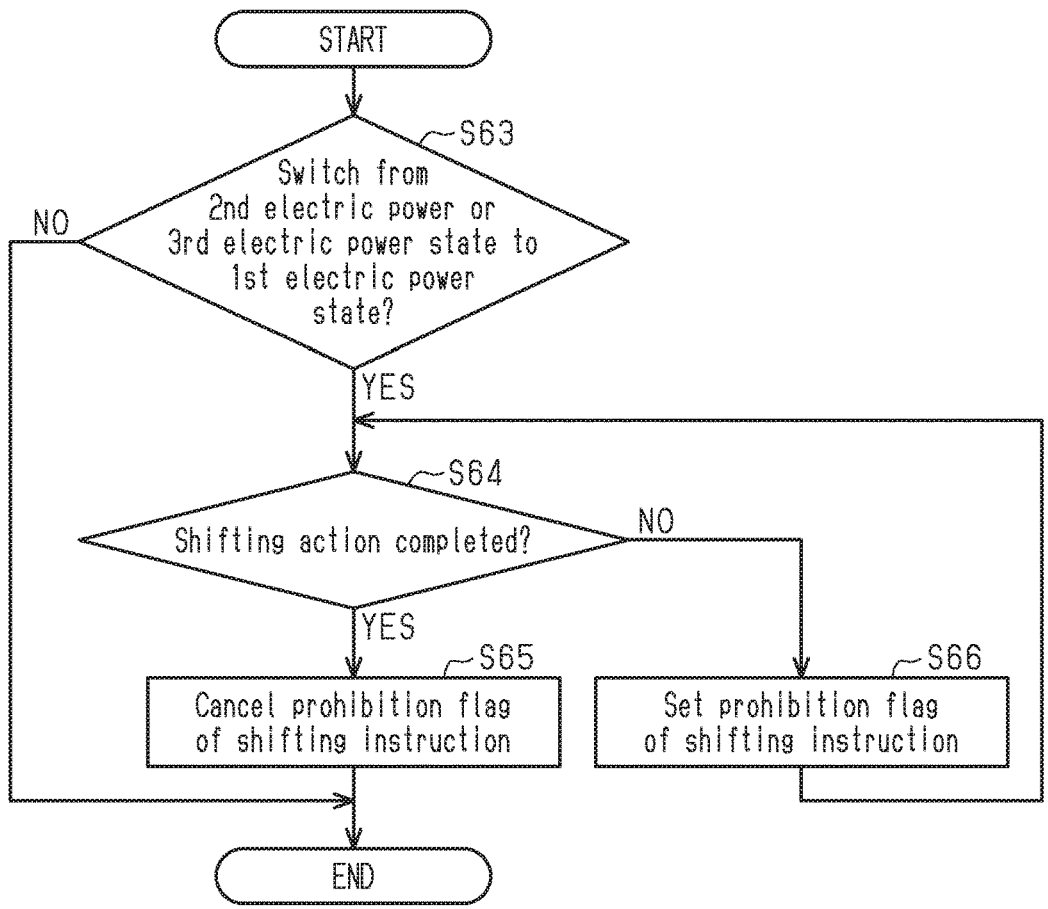
FIG. 9 is a flowchart illustrating a process executed by the electronic controller shown in FIG. 2 to prohibit issuance of a shifting instruction in a case where the electronic controller switches to a first electric power state.
Figure 10:
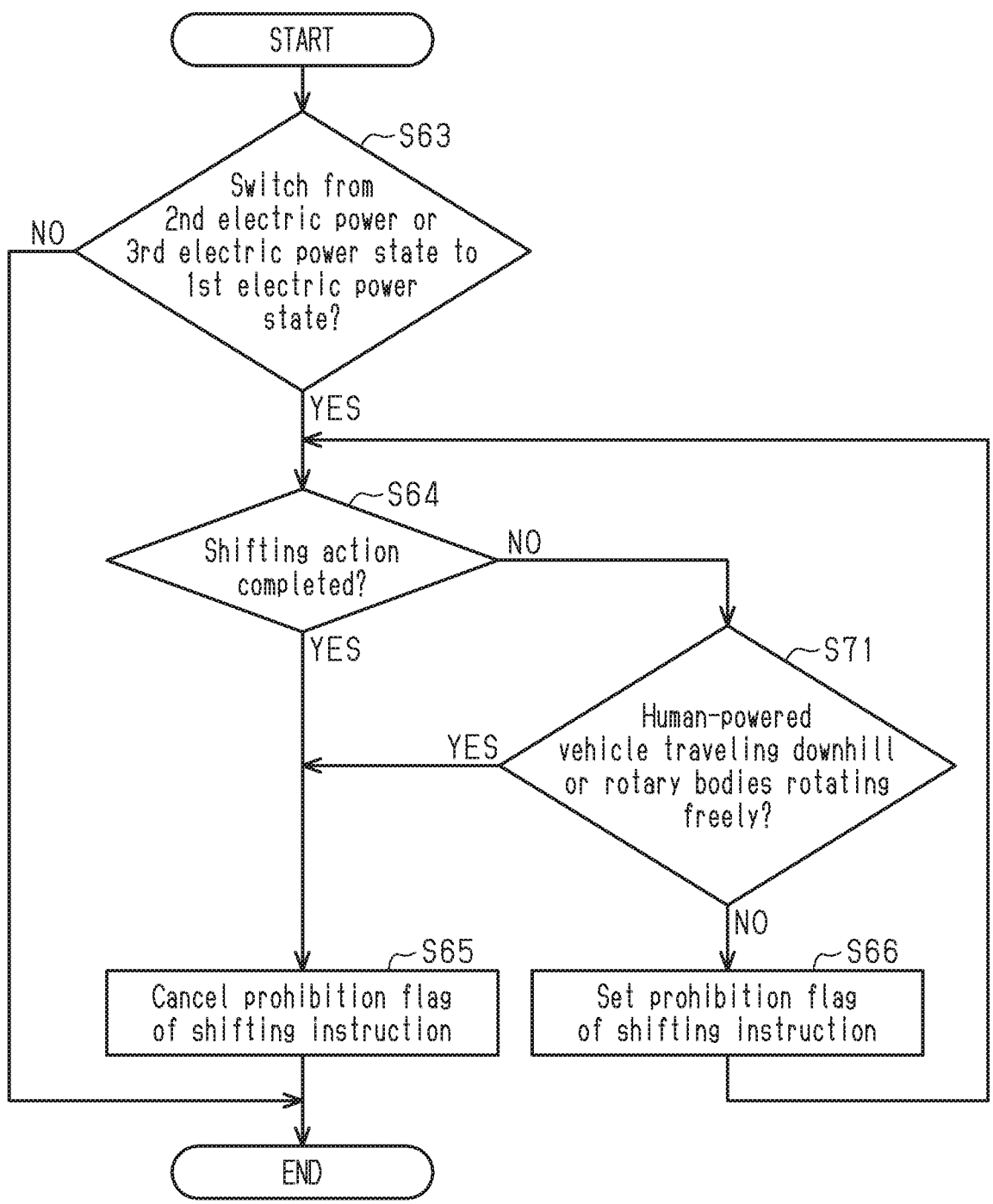
FIG. 10 is a flowchart illustrating a process executed by the electronic controller of a first modification to prohibit issuance of a shifting instruction in a case where the electronic controller switches to a first electric power state.

Instead of at least one of step S30 in FIG. 5, step S64 in FIG. 9, and step S64 in FIG. 10, the electronic controller 62 can be configured to execute a determination process on whether or not the transferring member 16 is engaged with the rotary bodies 20 or whether or not the transferring member 16 is in a stable state. The electronic controller 62 can determine whether or not the transferring member 16 is engaged with the rotary bodies 20 or whether or not the transferring member 16 is in a stable state, for example, in accordance with output of a detector that detects a phase of a structure engaging the transferring member 16 provided on the rotary bodies 20.

Instead of at least one of step S29 in FIG. 5 and step S71 in FIG. 10, the electronic controller 62 can be configured to execute a determination process on whether or not a human driving force H is less than or equal to a predetermined human driving force HX. In a case where the human driving force H is less than or equal to the predetermined human driving force HX, the electronic controller 62 proceeds to YES. In a case where the human driving force H is not less than or equal to the predetermined human driving force HX, the electronic controller 62 proceeds to NO.

Figure 11:
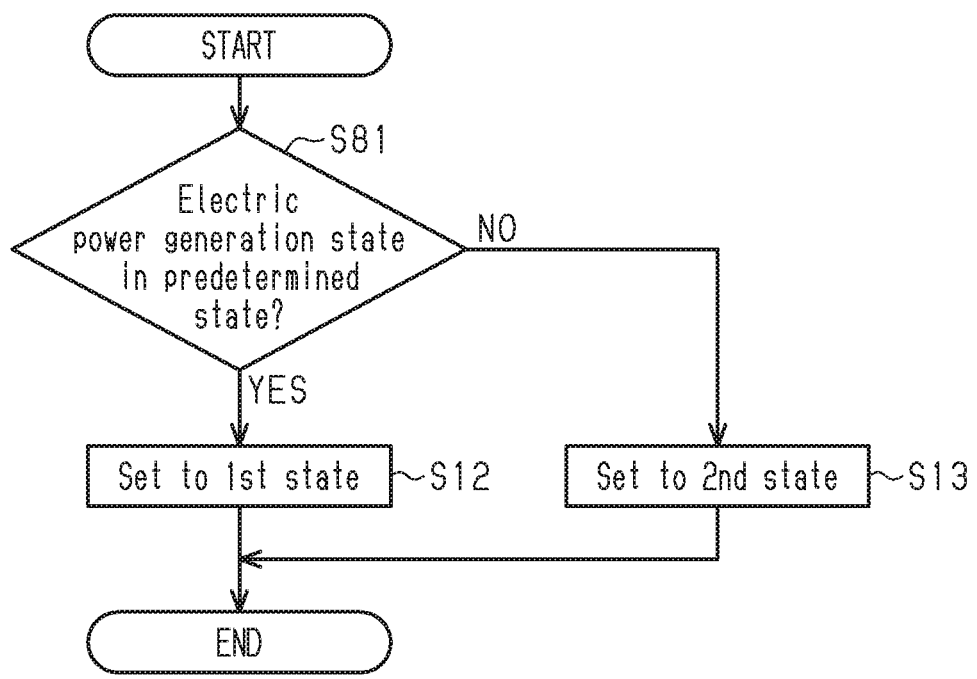
FIG. 11 is a flowchart illustrating a process executed by the electronic controller of a second modification to switch between a first state and a second state.

The electronic controller 62 can be configured to be capable of switching between the first state and the second state in accordance with an electric power generation state of the generator 56. For example, step S11 of the flowchart in FIG. 3 is changed to step S81 in FIG. 11. In step S81, the electronic controller 62 determines whether the electric power generation state of the generator 56 is a predetermined state. In a case where the electric power generation state of the generator 56 is the predetermined state, the electronic controller 62 proceeds to step S12. In a case where the electric power generation state of the generator 56 is not the predetermined state, the electronic controller 62 proceeds to step S13. The predetermined state includes, for example, a state in which the generator 56 is capable of generating an amount of electric power that is greater than or equal to a predetermined electric power generation amount. The electronic controller 62 determines that the electric power generation state of the generator 56 is the predetermined state, for example, if a detection signal corresponding to a case where a rotational speed of a hub rotary body, on which the generator 56 is provided, is input to the electronic controller 62 from the detector 66. The electronic controller 62 can determine whether the electric power generation state is the predetermined electric power generation state in accordance with output of a detector that detects an electric current generated by the generator 56.

The electronic controller 62 can be configured to be capable of controlling the component in accordance with the control condition set based on at least one of the travel state of the human-powered vehicle 10 and the state of the rider of the human-powered vehicle 10 and determine whether or not to control the component 18 in accordance with the electric power generation state of the generator 56. In this modification, instead of or in addition to the transmission 52, the component 18 can include at least one of a drive unit and a notification unit. A drive unit includes, for example, a motor that assists in propulsion of the human-powered vehicle 10. A notification unit includes at least one of a light and a display. A display includes, for example, at least one of a portable electronic device including a display panel, a display, a smartphone, a tablet computer, and a cycle computer. A notification unit can include a speaker. The electronic controller 62 is configured to be capable of actuating at least one of the drive unit and the notification unit, for example, in a case where the electric power generation amount of the generator 56 becomes greater than or equal to a predetermined electric power generation amount. In this modification, the electronic controller 62 does not have to include the first state and the second state.

The electronic controller 62 can be configured to be capable of controlling the shifting action of the transmission 52 in accordance with the control condition set based on at least one of the travel state of the human-powered vehicle 10 and the state of the rider of the human-powered vehicle 10, and the electronic controller 62 can determine whether or not to perform the shifting action of the transmission 52 in accordance with the electric power generation state of the generator 56. The electronic controller 62 sets the shifting event and issues the shifting instruction to the transmission 52, for example, in a case where the control condition is satisfied and the electric power generation amount of the generator 56 is greater than or equal to the predetermined electric power generation amount. In this modification, the electronic controller 62 does not have to include the first state and the second state.

The electronic controller 62 can be configured to be capable of controlling the shifting action of the transmission 52 in accordance with the control condition set based on at least one of the travel state of the human-powered vehicle 10 and the state of the rider of the human-powered vehicle 10 and determine whether or not to perform the shifting action of the transmission 52 in accordance with the rotational state of the rotary bodies 20. The electronic controller 62 sets the shifting event and issues the shifting instruction to the transmission 52, for example, in a case where the control condition is satisfied and the rotational speed V of the rotary bodies 20 is greater than or equal to the speed VA. In this modification, the electronic controller 62 does not have to include the first state and the second state.

Figure 8:
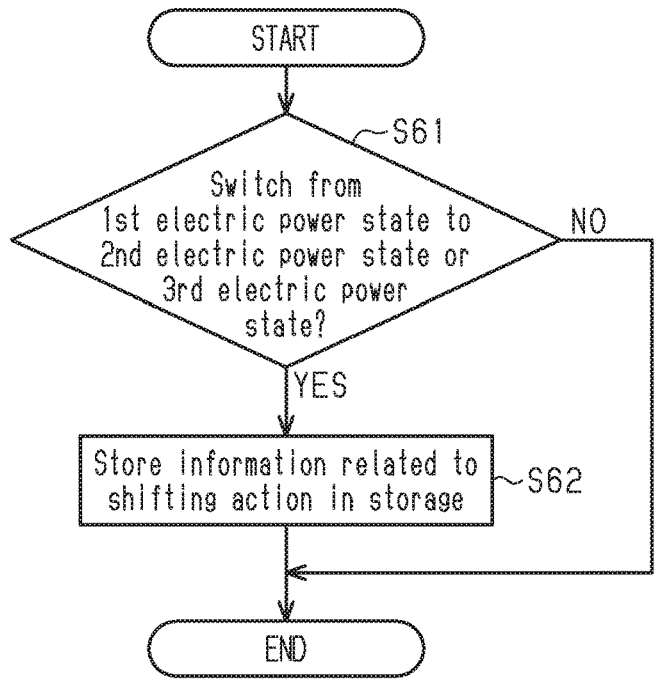
FIG. 8 is a flowchart illustrating a process executed by the electronic controller shown in FIG. 2 to store information related to the shifting action in a case where the electronic controller switches the electric power state.

The electronic controller 62 can determine whether the shifting action has been completed between step S61 and step S62 in FIG. 8. In this case, in a case where the shifting action has not been completed, the electronic controller 62 can set the prohibition flag of the shifting instruction in step S62 and store the flag in the storage 64. In this case, in a case where step S63 in FIG. 9 is YES, the electronic controller 62 determines whether the prohibition flag of the shifting instruction has been set in step S62. In a case where the prohibition flag of the shifting instruction has not been set in step S62, the electronic controller 62 ends the process. In a case where the prohibition flag of the shifting instruction has been set in step S62, the electronic controller 62 proceeds to step S64 and determines whether the shifting action has been completed in step S64. That is, in a case where the prohibition flag of the shifting instruction has not been set in step S62, the electronic controller 62 ends the process without determining whether the shifting action has been completed in step S64. The electronic controller 62 determines that the shifting action has been completed in a case where the rotational angle A of the rotary bodies 20 from a time at which the electronic controller 62 switched from the second electric power state or the third electric power state to the first electric power state is greater than or equal to the predetermined angle AX in step S64. In this case, the predetermined wait period TA is a period until a time at which the rotational angle A of the rotary bodies 20 becomes greater than or equal to the predetermined angle AX.

Instead of or in addition to the output of the detector 66 that detects the rotational state of the rotary bodies 20, the electronic controller 62 can switch between the first state and the second state in accordance with output of a sensor that detects the electric power generation state of the generator 56.

The generator 56 can be provided, for example, on the front wheel 24B. The generator 56 can be omitted from the transmission system 50. The transmission 52 can be a front derailleur. In this case, the first rotary body 12 includes the rotary bodies 20.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a human-powered vehicle including a first rotary body, a second rotary body, a transferring member configured to transfer a drive force between the first rotary body and the second rotary body, and a human-powered vehicle component; at least one of the first rotary body and the second rotary body including a plurality of rotary bodies; and the component including a transmission configured to perform a shifting action to move the transferring member from one of the plurality of rotary bodies to another one of the plurality of rotary bodies, the control device comprising:
an electronic controller configured to control the shifting action of the transmission in accordance with a control condition set based on at least one of a travel state of the human-powered vehicle and a state of a rider of the human-powered vehicle,
the electronic controller including a first state in which the electronic controller determines whether or not the control condition is satisfied and a second state in which the electronic controller does not determine whether or not the control condition is satisfied, and
the electronic controller being configured to switch between the first state and the second state in accordance with a rotational state of the plurality of rotary bodies.

2. The control device according to claim 1, wherein the human-powered vehicle further includes a generator configured to generate electric power as the human-powered vehicle travels, and
the electronic controller is configured to switch between the first state and the second state in accordance with an electric power generation state of the generator.

3. A control device for a human-powered vehicle including a generator configured to generate electric power as the human-powered vehicle travels and a human-powered vehicle component, the component including at least one of a drive unit and a notification unit, the control device comprising:
an electronic controller configured to control the component in accordance with a control condition set based on at least one of a travel state of the human-powered vehicle and a state of a rider of the human-powered vehicle,
the electronic controller being configured to determine whether or not to control the component in accordance with an electric power generation state of the generator.

4. The control device according to claim 3, wherein the electronic controller includes a first state in which the electronic controller determines whether or not the control condition is satisfied and a second state in which the electronic controller does not determine whether or not the control condition is satisfied, and
the electronic controller is configured to switch between the first state and the second state in accordance with the electric power generation state of the generator.

5. The control device according to claim 3, further comprising
a detector configured to detect at least one of the travel state of the human-powered vehicle and the state of the rider of the human-powered vehicle,
the electronic controller being configured to control the component in accordance with the control condition upon receiving a predetermined signal from the detector.

6. The control device according to claim 3, wherein the human-powered vehicle further includes a first rotary body, a second rotary body, and a transferring member configured to transfer a drive force between the first rotary body and the second rotary body;
at least one of the first rotary body and the second rotary body includes a plurality of rotary bodies;
the generator is configured to generate electric power in accordance with rotation of the plurality of rotary bodies;
the component includes a transmission that performs a shifting action to move the transferring member from one of the plurality of rotary bodies to another one of the plurality of rotary bodies;
the electronic controller is configured to control the shifting action of the transmission in accordance with a control condition set based on at least one of a travel state of the human-powered vehicle and a state of a rider of the human-powered vehicle; and
the electronic controller is configured to determine whether or not to perform the shifting action of the transmission in accordance with an electric power generation state of the generator.

7. The control device according to claim 1, further comprising a detector configured to detect at least one of the travel state of the human-powered vehicle and the state of the rider of the human-powered vehicle,
the electronic controller being configured to control the transmission in accordance with the control condition upon receiving a predetermined signal from the detector.

8. The control device according to claim 7, wherein
the detector is configured to detect a rotational speed of the plurality of rotary bodies.

9. The control device according to claim 2, wherein
the electronic controller is configured switch between a first electric power state and a second electric power state that consumes less electric power than the first electric power state; and
the electronic controller is configured to switch from the first electric power state to the second electric power state upon determining a state exists in which a rotational speed of the plurality of rotary bodies is less than or equal to a predetermined first speed continues over a predetermined first period or longer.

10. The control device according to claim 9, wherein
the electronic controller is configured to selectively switch between the first electric power state, the second electric power state, and a third electric power state that consumes less electric power than the second electric power state; and
the electronic controller is configured to switch from the second electric power state to the third electric power state upon determining a state exists in which the rotational speed of the plurality of rotary bodies is less than or equal to a predetermined second speed continues over a predetermined second period or longer.

11. The control device according to claim 10, wherein
the electronic controller is configured to switch from the third electric power state to the first electric power state or the second electric power state upon determining at least one of the rotational speed of the plurality of rotary bodies becoming greater than or equal to a predetermined third speed and an electric power generation amount of the generator becoming greater than or equal to a predetermined electric power generation amount.

12. The control device according to claim 10, wherein
the electronic controller is configured to control the transmission so as not to perform the shifting action until a predetermined wait period elapses after switching to the first electric power state upon determining a rotational angle of the plurality of rotary bodies is less than a predetermined angle during a period from a time at which the transmission starts the shifting action in the first electric power state to a time at which the electronic controller switches to the second electric power state or the third electric power state.

13. The control device according to claim 12, wherein
the predetermined wait period is a period from a time at which the transmission starts the shifting action to a time at which the rotational angle of the plurality of rotary bodies becomes greater than or equal to a predetermined angle.

14. The control device according to claim 12, wherein
the electronic controller is configured to control the shifting action of the transmission to be performed in a case where the rotational angle of the plurality of rotary bodies is less than a predetermined angle even if the predetermined wait period has not elapsed after switching to the first electric power state upon determining at least one of the human-powered vehicle traveling downhill and the plurality of rotary bodies rotating freely, during a period from a time at which the transmission starts the shifting action in the first electric power state to a time at which the electronic controller switches to the second electric power state or the third electric power state.

15. The control device according to claim 12, wherein
the predetermined angle differs in accordance with a shift stage of the transmission.

16. The control device according to claim 10, further comprising
a storage, the electronic controller is configured to store information related to the shifting action of the transmission in the storage upon determining the electronic controller switches from the first electric power state to the second electric power state or the third electric power state.

17. The control device according to claim 1, wherein
the electronic controller is configured to control the shifting action of the transmission to be performed for a number of times during a predetermined third period in at least one of the human-powered vehicle traveling downhill and the plurality of rotary bodies rotating freely.

18. The control device according to claim 1, wherein
the electronic controller is configured to control the shifting action of the transmission to be performed once during a predetermined fourth period in at least one of the human-powered vehicle not traveling downhill and the plurality of rotary bodies not rotating freely.

19. The control device according to claim 1, wherein
the electronic controller is configured to control the shifting action of the transmission to be started in accordance with a phase of the plurality of rotary bodies.

20. The control device according to claim 1, wherein
the electronic controller is configured to control the shifting action of the transmission so that a shift stage of the transmission is within a predetermined range in accordance with at least one of the travel state of the human-powered vehicle and the state of the rider of the human-powered vehicle, and
the predetermined range is configured to be changeable in accordance with an inclination of the human-powered vehicle.

21. The control device according to claim 20, wherein
the inclination of the human-powered vehicle includes a pitch angle of a vehicle body of the human-powered vehicle.

22. The control device according to claim 20, wherein
the electronic controller is configured to control the shifting action of the transmission upon determining a parameter related to at least one of the travel state of the human-powered vehicle and the state of the rider of the human-powered vehicle exceeding a predetermined parameter range, and
the electronic controller is configured to change the predetermined parameter range upon determining the shift stage of the transmission is outside of the predetermined range.

23. The control device according to claim 22, wherein
the predetermined parameter range is a range that is greater than or equal to a first threshold value and less than or equal to a second threshold value, and
the electronic controller is configured to decrease the second threshold value upon determining the shift stage of the transmission is smaller than the predetermined range, and increase the first threshold value upon determining the shift stage of the transmission is larger than the predetermined range.

24. The control device according to claim 1, wherein the transmission is a rear derailleur.

25. The control device according to claim 1, wherein
at least one of the travel state of the human-powered vehicle and the state of the rider of the human-powered vehicle includes an inclination of the human-powered vehicle, an acceleration of the human-powered vehicle, a rotational speed of a crank, a human driving force, a vehicle speed, a heartrate of the rider, and a travel load.

26. A control device for a human-powered vehicle including a first rotary body, a second rotary body, a transferring member configured to transfer a drive force between the first rotary body and the second rotary body, and a human-powered vehicle component; at least one of the first rotary body and the second rotary body including a plurality of rotary bodies; the component including a transmission configured to perform a shifting action to move the transferring member from one of the plurality of rotary bodies to another one of the plurality of rotary bodies; and a detector configured to detect a rotational speed of the plurality of rotary bodies with a detected portion provided on the plurality of rotary bodies, the detected portion rotated integrally with the plurality of rotary bodies,
the control device comprising:
an electronic controller configured to control the shifting action of the transmission in accordance with a control condition set based on at least one of a travel state of the human-powered vehicle and a state of a rider of the human-powered vehicle, wherein
the electronic controller being configured to determine whether or not to perform the shifting action in accordance with a rotational state of the plurality of rotary bodies.

27. A transmission system comprising the control device according to claim 2, the transmission system comprising:
the transmission; and
the generator,
the transmission being configured to be actuated by electric power generated by the generator.

* * * * *